United States Patent
Little et al.

(10) Patent No.: US 10,399,076 B2
(45) Date of Patent: Sep. 3, 2019

(54) METHODS OF PRODUCING FERRIHYDRITE NANOPARTICLE SLURRIES, AND SYSTEMS AND PRODUCTS EMPLOYING THE SAME

(71) Applicant: SULFURCYCLE INTELLECTUAL PROPERTY HOLDING COMPANY, LLC, Broomfield, CO (US)

(72) Inventors: Charles Deane Little, Niwot, CO (US); Megan Catherine Cousins, Louisville, CO (US); Margarite Patricia Parker, Wheat Ridge, CO (US); Tara S. Gedvilas, Golden, CO (US); Jason Aaron Barton, Boulder, CO (US); Philip Henry Michael, Boulder, CO (US); Joe Kosmoski, Longmont, CO (US)

(73) Assignee: SulfurCycle Intellectual Property Holding Company, Broomfield, CO (US)

( * ) Notice: Subject to any disclaimer, the term of this patent is extended or adjusted under 35 U.S.C. 154(b) by 29 days.

(21) Appl. No.: 15/470,665

(22) Filed: Mar. 27, 2017

(65) Prior Publication Data
US 2017/0274371 A1    Sep. 28, 2017

Related U.S. Application Data

(60) Provisional application No. 62/314,252, filed on Mar. 28, 2016.

(51) Int. Cl.
*B01J 20/30* (2006.01)
*B01J 20/02* (2006.01)
*B01J 20/22* (2006.01)
*B01J 20/32* (2006.01)
*B01J 47/018* (2017.01)
(Continued)

(52) U.S. Cl.
CPC ......... *B01J 47/018* (2017.01); *B01J 20/0229* (2013.01); *B01J 20/261* (2013.01); *B01J 20/28007* (2013.01); *B01J 20/3085* (2013.01); *B01J 20/3204* (2013.01); *B01J 20/327* (2013.01); *B01J 20/3433* (2013.01); *B01J 20/3458* (2013.01); *C02F 2103/06* (2013.01)

(58) Field of Classification Search
None
See application file for complete search history.

(56) References Cited

U.S. PATENT DOCUMENTS

2010/0307980 A1    12/2010    Tranter et al.

FOREIGN PATENT DOCUMENTS

| WO | 1985001058 | 3/1985 |
| WO | 1990001984 | 3/1990 |

(Continued)

OTHER PUBLICATIONS

PCT International Search Report and Written Opinion in PCT/US2017024345, dated Jul. 10, 2017, 13 pages.

*Primary Examiner* — Daniel Berns

(57) ABSTRACT

The present disclosure relates to methods of synthesizing slurries comprising ferrihydrite nanoparticles, and systems and methods employing the same. The method may include the steps of preparing an aqueous solution having ferric iron cations, halide anions, and a two-line iron promoter, and precipitating the ferrihydrite nanoparticles in the aqueous solution, thereby producing a ferrihydrite slurry. The ferrihydrite slurries may be useful in treating a polluted fluid having sulfur contaminants therein.

19 Claims, 16 Drawing Sheets

(51) Int. Cl.
*B01J 20/26* (2006.01)
*B01J 20/28* (2006.01)
*B01J 20/34* (2006.01)
C02F 103/06 (2006.01)

(56) References Cited

FOREIGN PATENT DOCUMENTS

| | | |
|---|---|---|
| WO | 1992017401 | 10/1992 |
| WO | 2008071747 | 6/2008 |

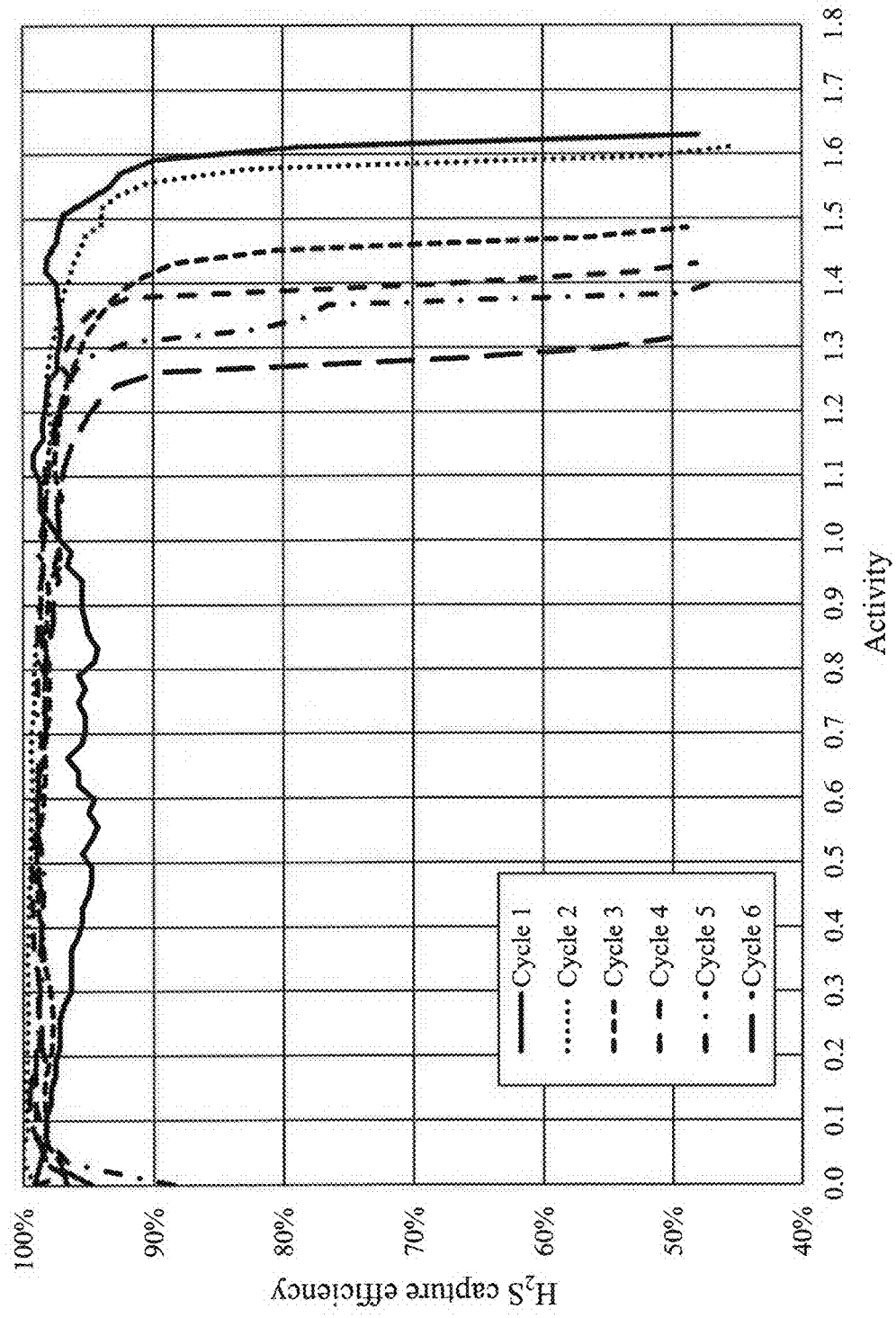

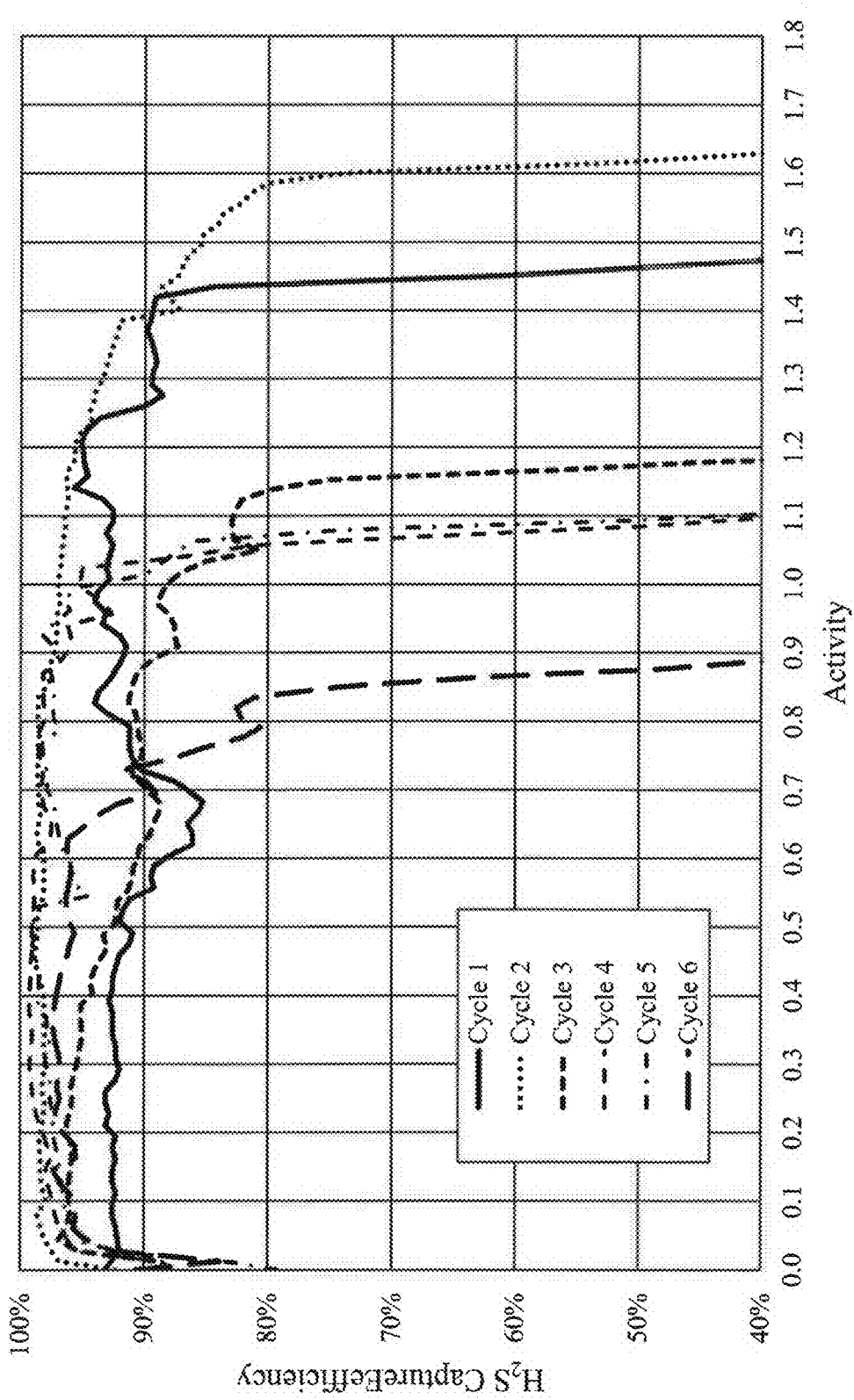
FIG. 6 - Capture Efficiency vs. Activity Ferrihydrite(SO₄) Slurry with 1:20 D-Sorbitol

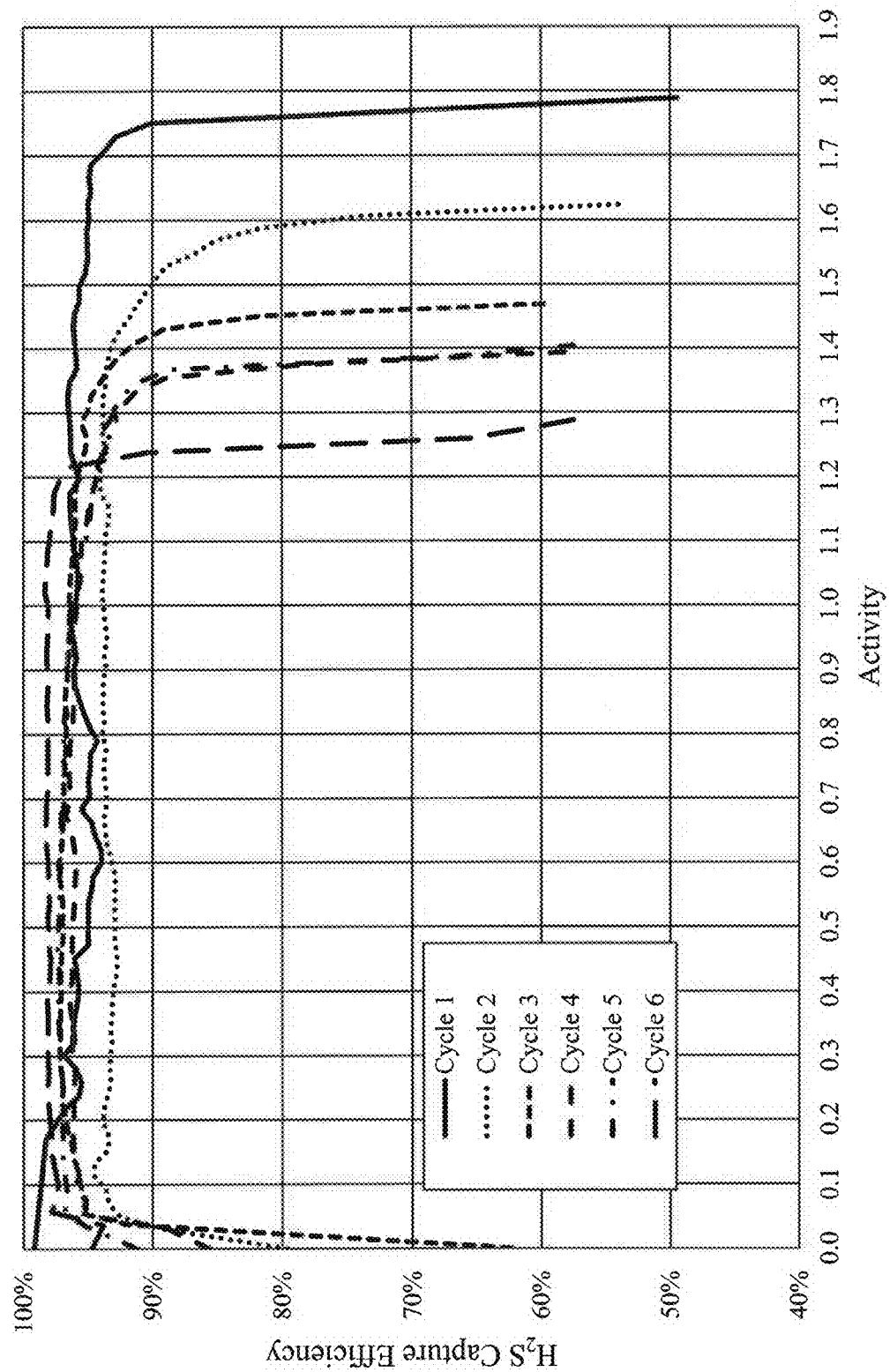
FIG. 7 - Capture Efficiency vs. Activity Ferrihydrite(Cl₃) Slurry (no D-Sorbitol)

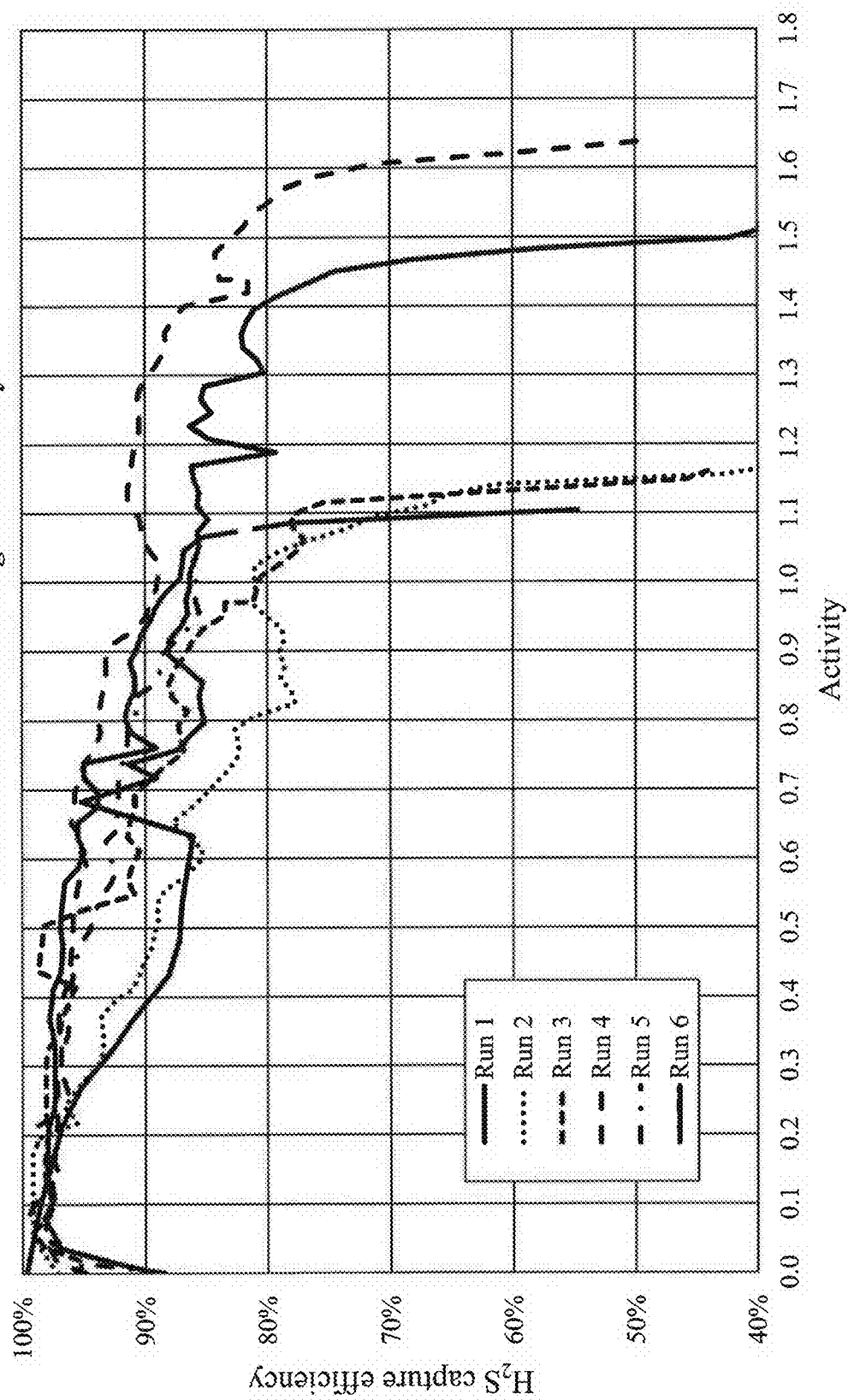

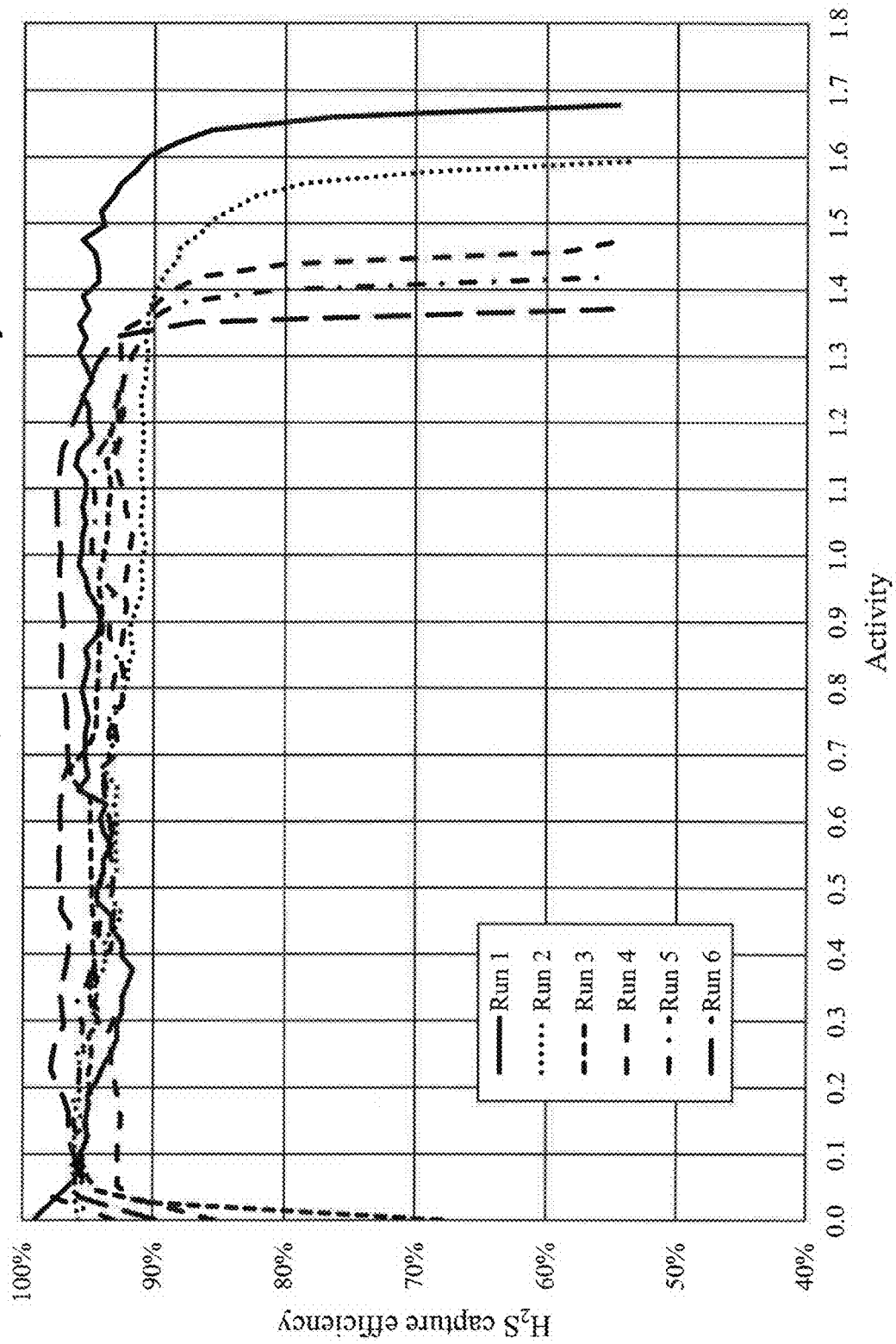
FIG. 9 Capture Efficiency vs. Activity
Ferrihydrite(Cl₃) + Sodium Metasilicate Slurry

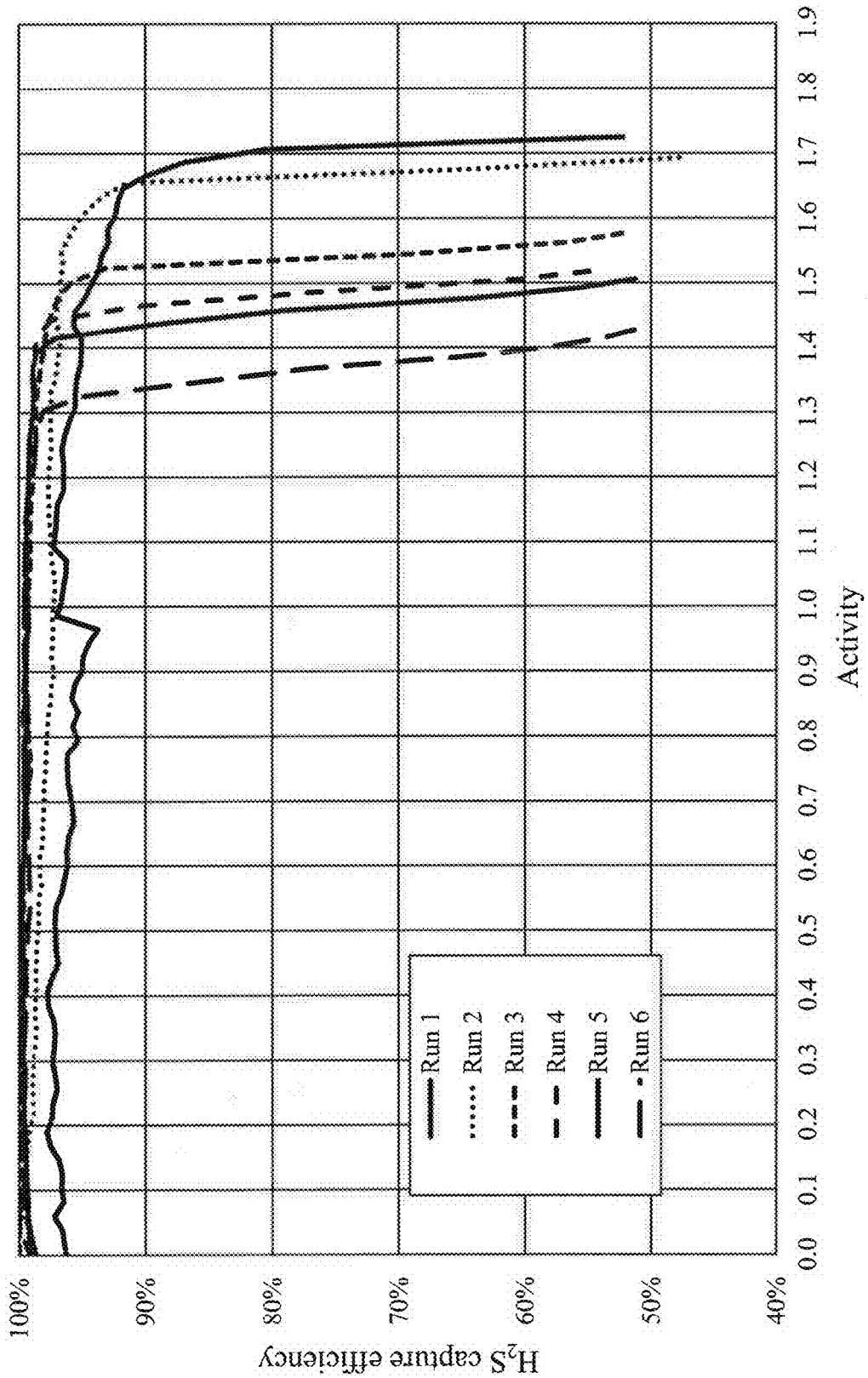
FIG. 10 - Capture Efficiency vs. Activity
Ferrihydrite(Cl₃) + Sodium Metasilicate + D-Sorbitol Slurry

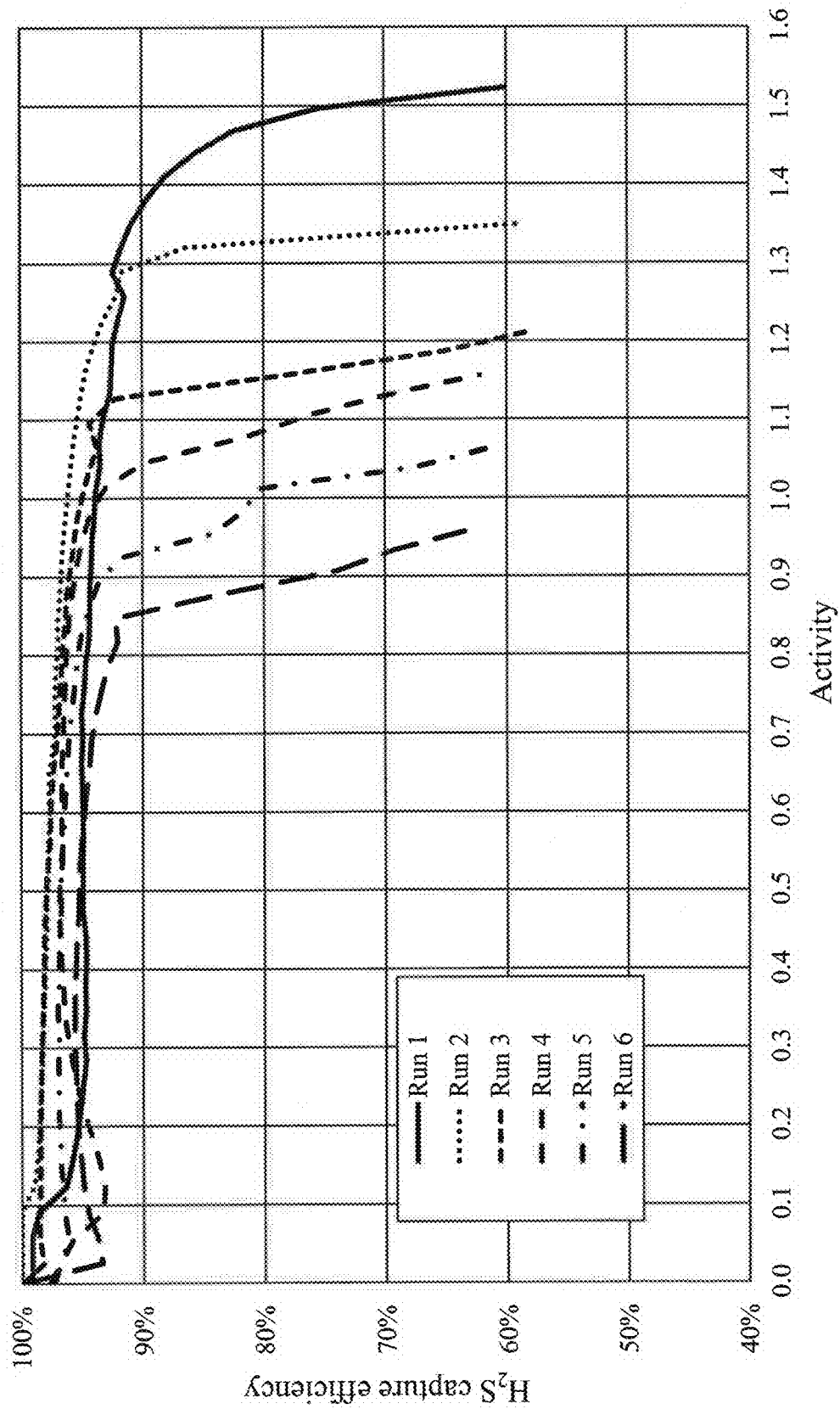
FIG. 11 - Capture Efficiency vs. Activity
Ferrihydrite + D-Sorbitol Slurry (Cl- removed)

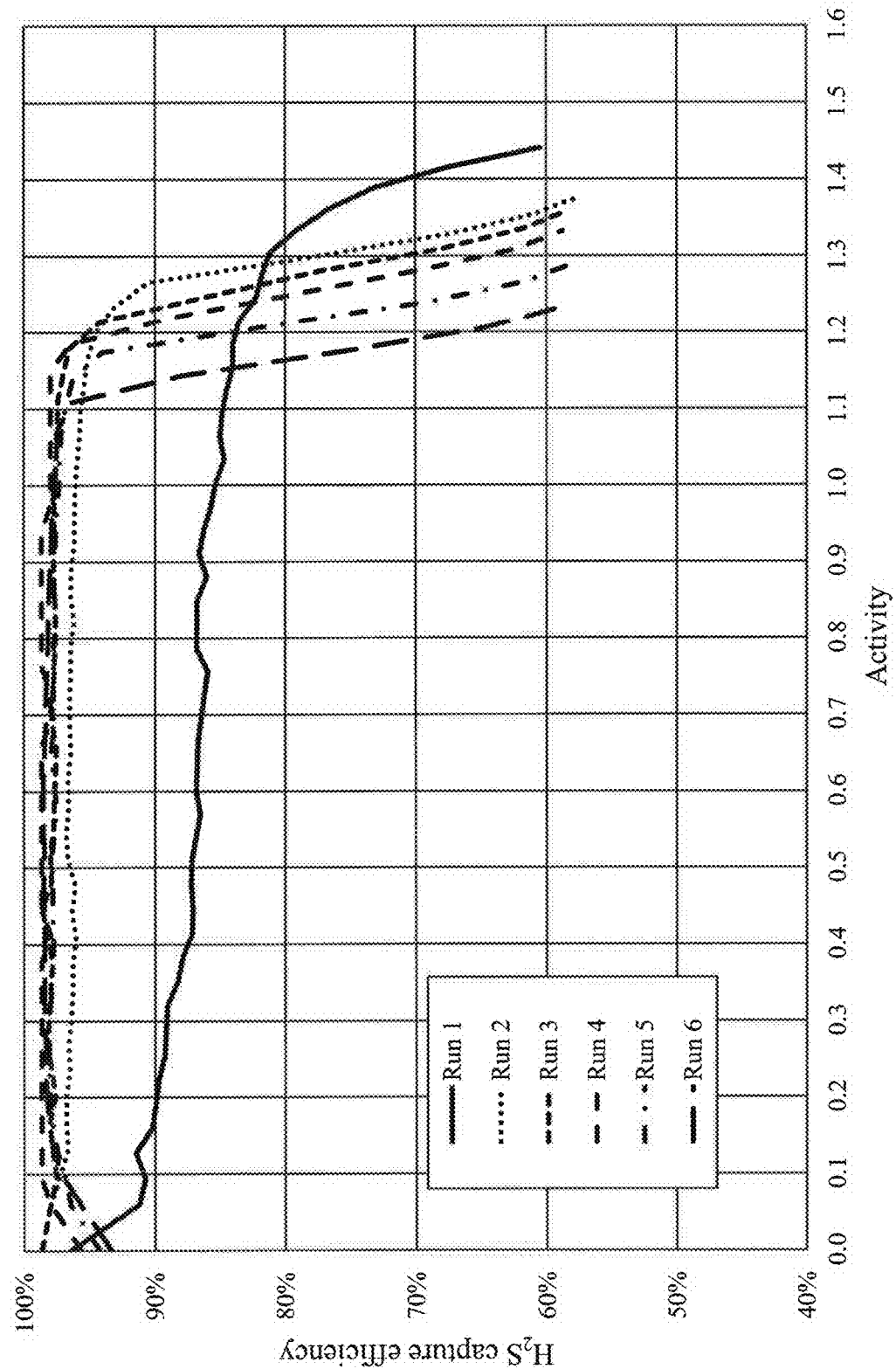
FIG. 12 - Capture Efficiency vs. Activity
Lepidocrocite + D-Sorbitol Slurry

METHODS OF PRODUCING FERRIHYDRITE NANOPARTICLE SLURRIES, AND SYSTEMS AND PRODUCTS EMPLOYING THE SAME

CROSS-REFERENCE TO RELATED APPLICATIONS

This patent application claims priority to Prov. U.S. Pat. App. Ser. No. 62/314,252, filed Mar. 28, 2016, entitled "METHODS OF PRODUCING FERRIHYDRITE NANOPARTICLE SLURRIES, AND SYSTEMS AND PRODUCTS EMPLOYING THE SAME," which is incorporated herein by reference in its entirety.

BACKGROUND

Hydrogen sulfide ($H_2S$) is a colorless gas with the characteristic foul odor of rotten eggs. $H_2S$ gas is heavier than air, poisonous, corrosive, flammable, and explosive. One known process for removing $H_2S$ is the Claus process, which uses a partial combustion and catalytic oxidation to convert $H_2S$ to elemental sulfur. The Claus process is expensive, generally only economically viable when used in large scale sulfur removal operations.

SUMMARY

Broadly, the present patent application relates to methods of producing slurries having ferrihydrite nanoparticles therein, and systems and products employing such slurries. The slurries may be useful, for instance, in removing $H_2S$ and/or other sulfur pollutants (e.g., COS, $CS_2$, mercaptans) from a fluid stream. The "Definitions" section towards the end of this summary defines "ferrihydrite nanoparticles," as well as many other terms used in this patent application.

A. Overview

Referring now to FIG. 1, one method of producing a ferrihydrite slurry includes the steps of preparing (100) an aqueous solution comprising ferric iron ($Fe^{3+}$) cations, halide anions, and at least one two-line iron (2LI) promoter, and then precipitating (200) ferrihydrite nanoparticles in the aqueous solution. As shown in FIG. 2, the aqueous solution (20) may be prepared in a container (10) by adding (30) at least one 2LI promoter, and by adding (40) at least one iron salt to water. If the iron salt is not an iron halide salt, optional additional halide-containing salt (42) may be added to the aqueous solution (20) to produce the halide anions. As shown in FIG. 3, the ferrihydrite nanoparticles (60) may be precipitated in the aqueous solution by raising the pH of the solution, such as by contacting the aqueous solution with a caustic (50) (e.g., an alkali caustic solution). The resultant slurry comprises ferrihydrite nanoparticles (e.g., two-line iron nanoparticles, lepidocrocite nanoparticles, or combinations thereof), the 2LI promoter, halide anions, and alkali cations. The resultant slurry may be useful in treating polluted sulfur-containing fluids, such as gases containing $H_2S$, including natural gas, syngas, geothermal steam, and biogas, as well as liquids such as sour water and sour crude oil.

B. Preparation of the Aqueous Solution

As shown in FIG. 2, the aqueous solution having the ferric iron cations, halide anions, and at least one 2LI promoter is generally produced by adding an iron salt, such as ferric chloride, to an aqueous solution, such as water (e.g., potable water, deionized water, other water source having not greater than 1000 ppm of sulfate anions ($SO_4^-$)). A 2LI promoter, such as D-sorbitol, may also be added to the aqueous solution. The iron salt and the 2LI promoter can be added to the aqueous solution in any suitable order, or even contemporaneously. In one embodiment, the 2LI promoter is added prior to the addition of the iron salt. In another embodiment, the 2LI promoter is added at the same time as the addition of the iron salt. In another embodiment, the 2LI promoter is added after the addition of the iron salt (e.g., after the addition of the caustic), but within several hours (e.g., within 48 hours, or within 24 hours, or within 12 hours, or within 8 hours, or within 4 hours, or less) of the addition of the iron salt so as to restrict degradation of the precipitated ferrihydrite nanoparticles.

i. Iron Salts

As noted in the Definitions section, the iron salt used to produce the ferric iron cations may be a ferric or ferrous salt. If a ferrous salt is used, an oxidizing agent, such as hydrogen peroxide, may be added to the aqueous solution to change the oxidation state of at least some of the iron cations from ferrous($^{2+}$) to ferric ($^{3+}$) iron. As may be appreciated, the iron salts may be in hydrous or anhydrous form.

In one embodiment, the iron salt used to produce the ferric iron cations is a ferric iron salt. Some non-limiting examples of ferric iron salts useful in facilitating production of ferrihydrite nanoparticles include ferric halide salts (ferric bromide, ferric chloride, ferric fluoride, ferric iodide), ferric sulfate, ferric nitrate, ferric citrate, ferric molybdate, ferric perchlorate, ferric oxalate, ferric ammonium citrate, ferric EDTA, ferric tartrate, ferric acetate, and other non-halide ferric salts. The use of ferric halide salts may be preferred for some applications since using ferric halide salts forgoes the need to add additional halide salt to the aqueous solution. Generally the use of ferric fluoride is disfavored due to its potential to inhibit sulfur capture activity. Thus, in one approach, the ferric salt is a non-fluoride ferric halide salt. In a particular embodiment, the iron salt is ferric chloride ($FeCl_3$).

In another embodiment, the iron salt used to produce the ferric iron cations is a ferrous salt, such as ferrous halide salts (ferrous bromide, ferrous chloride, ferrous fluoride, ferrous iodide), ferrous sulfate, ferrous nitrate, ferrous perchlorate, ferrous citrate, ferrous molbydate, ferrous oxalate, ferrous ammonium citrate, ferrous EDTA, ferrous tartrate, ferrous acetate, and other non-halide ferrous salts. In one approach, the ferrous salt is a non-fluoride ferrous halide salt. In a particular embodiment, the iron salt is ferrous chloride ($FeCl_2$).

In yet another embodiment, both ferric iron salts and ferrous iron salts are used to produce the ferric iron cations of the aqueous solution, such as a mixture of any of the above-identified iron salts. As noted above, at least some of the ferrous iron cations of the aqueous solution may be changed to ferric ion cations via the use of a suitable oxidizing agent, such as hydrogen peroxide, ozone or oxygen. In one embodiment, the iron salt is selected from the group consisting of ferric chloride, ferrous chloride, and combinations thereof.

In another approach, one or more iron sulfides are used in lieu and/or in addition to iron salts. The iron sulfide may be FeS, for instance. The iron sulfides may be captured as a waste stream from other hydrogen sulfide capture processes, such as dry box towers. Dry box towers contain iron oxide pellets for desulfurization, and spent iron oxide pellets contain iron sulfides, such as iron monosulfide (FeS). These spent iron oxide pellets may be included in (e.g., suspended in) an aqueous solution at least including halide anions therein (the aqueous solution may also optionally include 2LI promoter). The oxidation of the iron sulfide in the aqueous solution having halides therein may produce the lepidocrocite species of ferrihydrite nanoparticles. The oxidation of the iron sulfide in the aqueous solution having halides and 2LI promoter therein may produce both the two-line iron species and the lepidocrocite species of ferrihydrite nanoparticles. Other FeS sources include, for instance, produced water, scale on equipment (e.g., from FeS produced via $H_2S$ reaction with iron in pipes and other iron-based materials (e.g., steels)), and geothermal waters, among others.

ii. Two-Line Iron Promoters

As noted in the Definitions section, a "2LI promoter" is a material added to an aqueous solution that preferentially promotes production of the two-line iron species of ferrihydrite nanoparticles in the aqueous solution (e.g., during their precipitation/the precipitating step), and/or preferentially restricts degradation of the two-line iron species of ferrihydrite nanoparticles in the aqueous solution. A 2LI promoter may inhibit formation of other iron crystalline structures. Some examples of 2LI promoters useful in accordance with the present invention include some carbon-based molecules and their isomers, or polymers having one or more hydroxyl groups (OH), such as some polyols (e.g., some sugar alcohols), some polysaccharides (e.g., cellulose), alcohols (e.g., methanol, ethanol) and diols (ethylene glycol). Other examples of 2LI promoters include some tetrahedral coordinated compounds (as incorporated into the final iron oxide nanoparticles, relative to oxygen), such as some alkali metasilicates.

In one embodiment, the 2LI promoter comprises a carbon-based molecule or polymer having one or more hydroxyl groups bonded to the carbon backbone of the molecule or polymer. Two-line iron nanoparticles precipitated in the precipitating step (200) may have Fe—OH groups, which may hydrogen bond to the hydroxyl groups of the polymer. Subsequent phase transformation of these two-line iron nanoparticles may be restricted by the molecule or polymer adsorbing to highly reactive, under-coordinated surface sites of the two-line iron nanoparticles.

In one aspect, the 2LI promoter comprises a polyol, such as a sugar alcohol. In one approach, the 2LI promoter is a non-cyclical sugar alcohol, such as any of the linear C3-C24 sugar alcohols. Linear sugar alcohols have more degrees of freedom than ringed compounds, and may more readily interact with surface Fe—OH groups of the ferrihydrite nanoparticles. In one embodiment, the 2LI promoter is a C6 sugar alcohol. In one embodiment, the 2LI promoter is selected from the group consisting of sorbitol, mannitol, galactitol, iditol, and combinations thereof. In one embodiment, the 2LI promoter is D-sorbitol. In another embodiment, the 2LI promoter is L-sorbitol.

In another embodiment, the 2LI promoter is a C3 sugar alcohol. In one embodiment, the 2LI promoter is glycerol.

In another embodiment, the 2LI promoter is a C4 sugar alcohol. In one embodiment, the 2LI promoter is selected from the group consisting of erythritol, threitol, and combinations thereof.

In another embodiment, the 2LI promoter is a C5 sugar alcohol. In one embodiment, the 2LI promoter is selected from the group consisting of arabitol, ribitol, xylitol, and combinations thereof.

In another embodiment, the 2LI promoter is a C7 sugar alcohol. In one embodiment, the 2LI promoter is volemitol.

In another embodiment, the 2LI promoter is a C12 sugar alcohol. In one embodiment, the 2LI promoter is lactitol.

In another embodiment, the 2LI promoter is a C18 sugar alcohol. In one embodiment, the 2LI promoter is maltotriitol.

In another embodiment, the 2LI promotor is a non-linear sugar alcohol polymer, such as maltotetraitol or polyglycitol.

In another embodiment, the 2LI promoter may be one of methanol, ethylene glycol, or inositol.

In another approach, the 2LI promoter is a monosaccharide, disaccharide, or oligosaccharide. In one embodiment, the 2LI promoter is a monosaccharide, such as any of the C3-C6 aldose or ketose saccharides. In another embodiment, the 2LI promoter is a disaccharide, such as any of the C12 disaccharides consisting of two C6 monomers connected by α or β glycosidic bonds. In one embodiment, the C12 disaccharide is sucrose.

In another approach, the 2LI promoter comprises a polysaccharide, such as a glucan or fructan material. In one embodiment, the 2LI promoter comprises at least one of dextran, dextrin, starch or cellulose. In one embodiment, the 2LI promoter is cellulose or digested cellulose.

In yet another approach, the 2LI promoter is a tetrahedral coordinated compound having tetrahedral coordination to oxygen of the ferrihydrite nanoparticles (e.g., to the oxygen of the two-line iron nanoparticles). In one embodiment, the tetrahedral coordinated compound is an alkali metasilicate, such as sodium metasilicate. When dissolved in the aqueous solution, sodium metasilicate may transform to silicic acid ($H_4SiO_4$), a tetrahedral coordinated compound. Two-line iron nanoparticles may include tetrahedral and octahedral coordinated iron atoms with respect to oxygen. Incorporating a tetrahedral coordinated compound, like a silicate, into the structure of and/or on the surface of the two-line iron nanoparticles may lead to enhanced stability of the two-line iron nanoparticles (e.g., because silicate(s) on the surface may bind to the reactive sites where phase transformation to other iron structures (e.g., hematite) can occur; because silicates may render the two-line iron nanoparticles less soluble, thereby restricting transformation to other iron structures (e.g., to goethite)). Thus, in one embodiment, the 2LI promoter is a silicate material, such as an alkali metasilicate or dissolvable silicon monomer materials. In one embodiment, the 2LI promoter comprises sodium metasilicate.

Additives similar to silicates that may have the same or similar effect, are, in general, compounds that have tetrahedral coordination to oxygen (in iron oxide nanoparticles) such as the following:

Phosphate, $PO_4^{3-}$
Molybdate, $MO_4^{2-}$
tetrahydroxyborate $B(OH)_4^-$
chromate, $CrO_4^{2-}$
tungstate, $WO_4^{2-}$
manganate $MnO_4^{2-}$
titanate, $TiO_4^{2-}$
zirconate, $ZrO_4^{4-}$ It is anticipated that, like sodium metasilicate, compounds using the above moieties could be added to the aqueous solution to facilitate production of two-line iron nanoparticles.

In one approach, the 2LI promoter is selected from the group consisting of the linear C3-C24 sugar alcohols, alkali metasilicates, and combinations thereof. In one embodiment, the 2LI promoter is selected from the group consisting of D-sorbitol, sodium metasilicate, and combinations thereof.

iii. pH of the Aqueous Solution

The pH of the aqueous solution should be sufficiently acidic to restrict premature precipitation of ferrihydrite nanoparticles. Generally, the step of adding the iron salt to the aqueous solution will generate an acidic pH. In one embodiment, prior to the precipitating step (200), the pH of the aqueous solution is not greater than 5.0. In another embodiment, prior to the precipitating step (200), the pH of the aqueous solution is not greater than 4.5. In yet another embodiment, prior to the precipitating step (200), the pH of the aqueous solution is not greater than 4.0. In another embodiment, prior to the precipitating step (200), the pH of the aqueous solution is not greater than 3.5. In yet another embodiment, prior to the precipitating step (200), the pH of the aqueous solution is not greater than 3.0.

iv. Molarity of the Aqueous Solution

The amount of iron cations in solution (both ferric and ferrous) should be controlled to facilitate an appropriate amount of ferrihydrite nanoparticles in the aqueous solution. In one approach, prior to the precipitating step (200), the iron molarity of the aqueous solution is from 0.01M to 4.78M (combined moles of $Fe^{2+}/Fe^{3+}$ per liter of the aqueous solution, at room temperature). In other words, the method may comprise adding a sufficient amount of the iron salt to realize an iron molarity of from 0.01M to 4.78M. In one embodiment, a method comprises adding a sufficient amount of the iron salt to realize an iron molarity of at least 0.02M. In another embodiment, a method comprises adding a sufficient amount of the iron salt to realize an iron molarity of at least 0.05M. In yet another embodiment, a method comprises adding a sufficient amount of the iron salt to realize an iron molarity of at least 0.10M. In another embodiment, a method comprises adding a sufficient amount of the iron salt to realize an iron molarity of at least 0.15M. In yet another embodiment, a method comprises a sufficient amount of the iron salt to realize an iron molarity of at least 0.20M. In another embodiment, a method comprises adding a sufficient amount of the iron salt to realize an iron molarity of at least 0.25M. In one embodiment, a method comprises adding a sufficient amount of the iron salt to realize an iron molarity of not greater than 4.0 M. In another embodiment, a method comprises adding a sufficient amount of the iron salt to realize an iron molarity of not greater than 3.5M. In yet another embodiment, a method comprises adding a sufficient amount of the iron salt to realize an iron molarity of not greater than 3.0M. In another embodiment, a method comprises adding a sufficient amount of the iron salt to realize an iron molarity of not greater than 2.5M. In yet another embodiment, a method comprises adding a sufficient amount of the iron salt to realize an iron molarity of not greater than 2.0M. In another embodiment, a method comprises adding a sufficient amount of the iron salt to realize an iron molarity of not greater than 1.5M. In yet another embodiment, a method comprises adding a sufficient amount of the iron salt to realize an iron molarity of not greater than 1.0M. In another embodiment, a method comprises adding a sufficient amount of the iron salt to realize an iron molarity of not greater than 0.75M. In yet another embodiment, a method comprises adding a sufficient amount of the iron salt to realize an iron molarity of not greater than 0.50M. In one particular approach, the iron molarity of the aqueous solution is from 0.20M to 0.50M. As described below, the aqueous solution can be diluted (e.g., after precipitation) to provide the appropriate amount of ferrihydrite nanoparticles in solution.

v. Ratio of Two-Line Iron Promoter to Iron

The ratio of the amounts of 2LI promoter and iron cations in the solution may facilitate production of the two-line iron species of the ferrihydrite nanoparticles during the precipitating step (200). In one embodiment, the aqueous solution comprises a molar ratio of from 1:2 to 1:1000 of the 2LI promoter to iron (2LI promoter: (combined amount of $Fe^{3+}$ plus $Fe^{2+}$)). In other words, due to the steps of adding an iron salt and adding a 2LI promoter, the aqueous solution comprises a molar ratio of from 1:2 to 1:1000 of the 2LI promoter to iron. In one embodiment, the molar ratio of the 2LI promoter to the iron (Fe) in the aqueous solution is at least 1:5. In another embodiment, the molar ratio of the 2LI promoter to the iron (Fe) in the aqueous solution is at least 1:10. In yet another embodiment, the molar ratio of the 2LI promoter to the iron (Fe) in the aqueous solution is at least 1:15. In another embodiment, the molar ratio of the 2LI promoter to the iron (Fe) in the aqueous solution is at least 1:20. In one embodiment, the molar ratio of the 2LI promoter to the iron (Fe) in the aqueous solution is not greater than 1:500. In another embodiment, the molar ratio of the 2LI promoter to the iron (Fe) in the aqueous solution is not greater than 1:100. In one embodiment, the aqueous solution comprises a molar ratio of from 1:10 to 1:100 of the 2LI promoter to iron.

vi. Amount of Halide Anions

As noted above, the aqueous solution should comprise at least some halide anions. As described in further detail below, halide anions may facilitate regeneration of the two-line iron species and/or lepidocrocite species of the ferrihydrite nanoparticles. In one embodiment, the halide anions comprise non-fluoride halide anions. Fluoride may be detrimental because its electronegativity might potentially interfere in sulfur contaminant removal. In one embodiment, the halide anions are chloride anions. The amount of halide ions in the aqueous solution should generally exceed the amount of iron ions in the aqueous solution. In one embodiment, the aqueous solution contains 1.5 halide ions for every iron ion, i.e. the aqueous solution has a halide ion to iron ion ratio of at least 1.5:1. In one embodiment, the aqueous solution contains from 2.0 to 5.0 halide ions for every iron ion, i.e. the aqueous solution has a halide ion to iron ion ratio of from 2:1 to 5:1.

C. Precipitation of Fresh Ferrihydrite Nanoparticles

As shown in FIGS. 1 and 3, fresh ferrihydrite nanoparticles may be precipitated in the aqueous solution via addition of caustic, such as an alkali caustic (e.g., NaOH or KOH), thereby producing the ferrihydrite slurry. As shown in FIG. 3, the method may include contacting the prepared aqueous solution with an alkali caustic, thereby raising the pH of the aqueous solution. The increase in pH will eventually lead to precipitation of fresh ferrihydrite nanoparticles or an intermediate thereof. In embodiments where lepidocrocite is being produced, oxidant addition (e.g., via air sparging; via hydrogen peroxide or ozone addition) may be required to oxidize an intermediate (e.g., a green rust intermediate) to form the lepidocrocite nanoparticles. A fresh ferrihydrite slurry comprising fresh two-line iron nanoparticles, fresh lepidocrocite nanoparticles, or combinations thereof may thus be produced.

After the contacting step, the fresh ferrihydrite slurry generally comprises fresh ferrihydrite nanoparticles, 2LI promoter, and with at least some alkali ions and at least some of the halide anions, after which the slurry may be used to treat a polluted sulfur-containing fluid (described in further detail below). In one embodiment, the fresh ferrihydrite slurry realizes a pH of from 5 to 12. In another embodiment, the fresh ferrihydrite slurry realizes a pH of at least 6. In one embodiment, the fresh ferrihydrite slurry realizes a pH of not greater than 9. In one embodiment, the fresh ferrihydrite slurry realizes a pH of from 6 to 8.

In some embodiments, it may be possible to omit the 2LI promoter from the ferrihydrite slurry. For instance, in embodiments, where lepidocrocite is being utilized in lieu of two-line iron nanoparticles, the 2LI promoter may be omitted from the ferrihydrite slurry. However, the halide anions should be included/should remain in the ferrihydrite slurry.

i. Rate of Addition of Caustic

The caustic should be added to the aqueous solution at a rate sufficiently high that formation of akaganeite is restricted. When producing the two-line iron species of the ferrihydrite nanoparticles, generally a sufficient amount of caustic should be added to rapidly increase the pH of the aqueous solution until a large volume of the two-line iron species of the ferrihydrite nanoparticles have precipitated/are precipitating and the pH of the solution is generally stable, generally around pH 4 for fresh aqueous solutions. At this point, the rate of caustic addition may be slowed to regulate the proper pH and inhibit reversion to akaganeite. The amount of caustic required to achieve this effect will depend on the iron molarity of the aqueous solution. Similar caustic rates may be employed when producing lepidocrocite. In one embodiment, a fresh ferrihydrite slurry comprises no akaganeite as measured via the IR Spectrum procedure, described in the Definitions section, below.

In one embodiment, at least 80% of the total amount of the caustic is added to the prepared aqueous solution within 2 hours. In another embodiment, at least 80% of the total amount of the caustic is added to the prepared aqueous solution within 1.5 hours. In yet another embodiment, at least 80% of the total amount of the caustic is added to the prepared aqueous solution within 1 hour. In another embodiment, at least 80% of the total amount of the caustic is added to the prepared aqueous solution within 30 minutes. In another embodiment, at least 80% of the total amount of the caustic is added to the prepared aqueous solution within 15 minutes. In another embodiment, at least 80% of the total amount of the caustic is added to the prepared aqueous solution within 5 minutes. In another embodiment, at least 80% of the total amount of the caustic is added to the prepared aqueous solution within 1 minute. In another embodiment, all of the caustic is added to all of the prepared aqueous solution at about the same time (e.g., via a static mixer).

ii. Content of Fresh Ferrihydrite Slurry

As noted above, after the contacting step, the fresh ferrihydrite slurry generally comprises fresh ferrihydrite nanoparticles, 2LI promoter, and with at least some alkali ions and at least some of the halide anions. Due to the processes disclosed herein, the fresh ferrihydrite slurry may contain a high volume of two-line iron nanoparticles, lepidocrocite nanoparticles, or combinations thereof. In one embodiment, the volume of fresh ferrihydrite nanoparticles of the fresh ferrihydrite slurry consist essentially of two-line iron nanoparticles. In another embodiment, the volume of fresh ferrihydrite nanoparticles of the fresh ferrihydrite slurry consist essentially of lepidocrocite nanoparticles. In yet another embodiment, the volume of fresh ferrihydrite nanoparticles of the fresh ferrihydrite slurry consist essentially of a mixture of two-line iron nanoparticles and lepidocrocite nanoparticles. In one embodiment, a fresh ferrihydrite slurry is generally free of akaganeite nanoparticles, goethite nanoparticles, hematite nanoparticles, and magnetite nanoparticles. The content of the fresh ferrihydrite nanoparticles may be determined in accordance with the Fresh XRD measurement and IR Spectrum measurement procedures, described in the "Definitions" section, below.

In some embodiments, it may be possible to omit the 2LI promoter from the ferrihydrite slurry. For instance, in embodiments, where lepidocrocite is being utilized in lieu of two-line iron nanoparticles, the 2LI promoter may be omitted from the ferrihydrite slurry. However, the halide anions should be included/should remain in the ferrihydrite slurry. Further, as shown in the below examples, a fresh ferrihydrite slurry consisting essentially of lepidocrocite may be regenerated into a regenerated ferrihydrite slurry having at least some two-line iron therein.

As described above, the iron molarity of the aqueous solution may be controlled to provide the appropriate amount of ferrihydrite nanoparticles in solution. As described below, the ferrihydrite nanoparticles may be dissolved by the sulfur of the polluted sulfur-containing fluid (e.g., by sulfur in the $2^-$ oxidation state), thereby producing ferrous iron ions. The reaction kinetics between sulfur and the ferrous iron ions is higher than that associated with the surface interaction of sulfur and the ferrihydrite nanoparticles, so it is preferred to use the appropriate amount of ferrihydrite nanoparticles in solution so as to facilitate a high capture efficiency, but without requiring a large time period to dissolve the ferrihydrite nanoparticles to ferrous iron ions. Controlling the molarity and/or diluting the ferrihydrite slurry may facilitate the appropriate amount of ferrihydrite nanoparticles in solution. In one approach, a fresh ferrihydrite slurry comprises from 0.05 to 10.0 wt. % ferrihydrite nanoparticles. In one embodiment, a fresh ferrihydrite slurry comprises at least 0.15 wt. % ferrihydrite nanoparticles. In another embodiment, a fresh ferrihydrite slurry comprises at least 0.25 wt. % ferrihydrite nanoparticles. In yet another embodiment, a fresh ferrihydrite slurry comprises at least 0.35 wt. % ferrihydrite nanoparticles. In another embodiment, a fresh ferrihydrite slurry comprises at least 0.50 wt. % ferrihydrite nanoparticles. In yet another embodiment, a fresh ferrihydrite slurry comprises at least 0.75 wt. % ferrihydrite nanoparticles. In one embodiment, a fresh ferrihydrite slurry comprises not greater than 9.0 wt. % ferrihydrite nanoparticles. In another embodiment, a fresh ferrihydrite slurry comprises not greater than 8.0 wt. % ferrihydrite nanoparticles. In yet another embodiment, a fresh ferrihydrite slurry comprises not greater than 7.0 wt. % ferrihydrite nanoparticles. In another embodiment, a fresh ferrihydrite slurry comprises not greater than 6.0 wt. % ferrihydrite nanoparticles. In yet another embodiment, a fresh ferrihydrite slurry comprises not greater than 5.0 wt. % ferrihydrite nanoparticles. In another embodiment, a fresh ferrihydrite slurry comprises not greater than 4.0 wt. % ferrihydrite nanoparticles. In yet another embodiment, a fresh ferrihydrite slurry comprises not greater than 3.5 wt. % ferrihydrite nanoparticles. In another embodiment, a fresh ferrihydrite slurry comprises not greater than 3.0 wt. % ferrihydrite nanoparticles. In yet another embodiment, a fresh ferrihydrite slurry comprises not greater than 2.5 wt. % ferrihydrite nanoparticles. In another embodiment, a fresh ferrihydrite slurry comprises not greater than 2.0 wt. % ferrihydrite nanoparticles. In yet another embodiment, a fresh ferrihydrite slurry comprises not greater than 1.5 wt. % ferrihydrite nanoparticles. As may be appreciated, more concentrated ferrihydrite slurries (e.g., having molarities higher than those directly corresponding to the weight percentages described in this paragraph) may be produced, and such concentrated ferrihydrite slurries may be appropriately diluted prior to use in treating a polluted sulfur-containing fluid stream.

D. Treatment of a Polluted Sulfur-Containing Fluid

Once produced, the ferrihydrite slurry may be used to treat a polluted sulfur-containing fluid. For instance, and referring now to FIG. 4a, a container (10) may include a fresh ferrihydrite slurry (400), the fresh ferrihydrite slurry having fresh ferrihydrite nanoparticles, the 2LI promoter, alkali ions and halide anions therein. A polluted sulfur-containing fluid stream (450), such as a natural gas stream comprising $H_2S$, may flow into the slurry (400) via a polluted fluid inlet (not shown). Due to the contents of the slurry, including the fresh ferrihydrite nanoparticles, much of the sulfur contaminants of the polluted fluid may be treated. In turn, a treated fluid (500) having substantially less sulfur pollutants may be discharged from the container (10) via a treated fluid outlet (not shown). Elemental sulfur may be produced as a result of the contact between the polluted sulfur-containing fluid stream (450) and the ferrihydrite slurry (400).

i. Regeneration

The ferrihydrite slurries produced in accordance with the technological teachings described herein may be regenerable, durable and stable. Referring now to FIG. 4b, a spent ferrihydrite slurry (405) may be readily regenerable via contact with an oxygen-containing fluid (i.e., an oxidizing agent), such as ambient air. In one embodiment, an ambient air stream (455) flows into the spent ferrihydrite slurry (405) via an air inlet (not shown), and a spent air-stream (505) is discharged via an air outlet (not shown). Due to the content of the ferrihydrite slurry, simple contact with air may regenerate a substantial amount of (or even all of) the ferrihydrite nanoparticles. The use of ambient air as the regenerating fluid forgoes the need for any special regeneration fluids, thereby reducing the cost of the $H_2S$ scrubbing system. The volume of air used in the regeneration should be sufficient to oxidize and regenerate the ferrihydrite nanoparticles. Generally at least 0.75 moles (e.g., 0.75-50 moles) of oxygen per mole of iron in the aqueous solution may be used.

It is hypothesized that the presence of sulfur in the slurry, in combination with the other materials of the slurry, may facilitate preferential regeneration of two-line iron nanoparticles. The sulfur-containing pollutant (e.g., $H_2S$) may at least partially dissolve at least some of the nanoparticles, which may produce hydroxide and ferrous ions. Bisulfide anions produced from the aqueous sulfur-containing pollutant may react with the ferrous ions to produce FeS(s). The FeS(s) may selectively be oxidized to the two-line nanoparticles by an oxidative dissolution mechanism wherein the FeS nanoparticles are oxidatively dissolved with an oxidant such as oxygen from air. The oxidative dissolution thereby produces zero-valent sulfur and ferrous ions which are readily reacted with dissolved oxygen, producing ferric ions. The ferric and ferrous ions may precipitate in aqueous solutions containing halide ions, preferably chloride ions, to form an intermediate (e.g., a green rust intermediate), which is subsequently selectively oxidized to the two-line nanoparticles. The proposed mechanism involves surface-mediated and solution-mediated processes, in combination with halide ions and 2LI promoters to facilitate generation of and regeneration of two-line iron nanoparticles.

Due to the processes disclosed herein, the regenerated ferrihydrite slurry may contain a high volume of two-line iron nanoparticles, lepidocrocite nanoparticles, or combinations thereof. In one embodiment, the volume of regenerated ferrihydrite nanoparticles of the regenerated ferrihydrite slurry consist essentially of two-line iron nanoparticles. In another embodiment, the volume of regenerated ferrihydrite nanoparticles of the regenerated ferrihydrite slurry consist essentially of lepidocrocite nanoparticles. In yet another embodiment, the volume of regenerated ferrihydrite nanoparticles of the regenerated ferrihydrite slurry consist essentially of a mixture of two-line iron nanoparticles and lepidocrocite nanoparticles. In one embodiment, a regenerated ferrihydrite slurry is generally free of akaganeite nanoparticles, goethite nanoparticles, hematite nanoparticles, and magnetite nanoparticles. The content of the regenerated ferrihydrite nanoparticles may be determined in accordance with the Regenerated XRD measurement and IR Spectrum measurement procedures, described in the "Definitions" section, below.

ii. Slurry Activity, Capture Efficiency and Durability

As shown by the below data, the new ferrihydrite slurries disclosed herein are capable of realizing high activity, low loss, and high capture efficiency. Further, the ferrihydrite slurries are durable, capable of realizing high six-cycle activity, low six-cycle loss, and high six-cycle capture efficiencies (average). The slurries are also stable, capable of realizing a low six-cycle standard deviation. These capabilities are to be tested in a batch setting, and not in a continuous recirculation setting. See, the "Definitions" section, below.

In one embodiment, a ferrihydrite slurry realizes a six-cycle activity of at least 6.0, when tested in accordance with the $H_2S$ Capture Procedure (defined below). In another embodiment, a ferrihydrite slurry realizes a six-cycle activity of at least 6.2. In yet another embodiment, a ferrihydrite slurry realizes a six-cycle activity of at least 6.4. In another embodiment, a ferrihydrite slurry realizes a six-cycle activity of at least 6.6. In yet another embodiment, a ferrihydrite slurry realizes a six-cycle activity of at least 6.8. In another embodiment, a ferrihydrite slurry realizes a six-cycle activity of at least 7.0. In yet another embodiment, a ferrihydrite slurry realizes a six-cycle activity of at least 7.2. In another embodiment, a ferrihydrite slurry realizes a six-cycle activity of at least 7.4. In yet another embodiment, a ferrihydrite slurry realizes a six-cycle activity of at least 7.5. In another embodiment, a ferrihydrite slurry realizes a six-cycle activity of at least 7.6. In yet another embodiment, a ferrihydrite slurry realizes a six-cycle activity of at least 7.7. In another embodiment, a ferrihydrite slurry realizes a six-cycle activity of at least 7.8. In yet another embodiment, a ferrihydrite slurry realizes a six-cycle activity of at least 7.9. In another embodiment, a ferrihydrite slurry realizes a six-cycle activity of at least 8.0. In yet another embodiment, a ferrihydrite slurry realizes a six-cycle activity of at least 8.1. In another embodiment, a ferrihydrite slurry realizes a six-cycle activity of at least 8.2. In yet another embodiment, a ferrihydrite slurry realizes a six-cycle activity of at least 8.3. In another embodiment, a ferrihydrite slurry realizes a six-cycle activity of at least 8.4. In yet another embodiment, a ferrihydrite slurry realizes a six-cycle activity of at least 8.5, or higher In one embodiment, a ferrihydrite slurry realizes a six-cycle loss of not greater than 45%, when tested in accordance with the $H_2S$ Capture Procedure (defined below). In another embodiment, a ferrihydrite slurry realizes a six-cycle loss of not greater than 40%. In yet another embodiment, a ferrihydrite slurry realizes a six-cycle loss of not greater than 37%. In another embodiment, a ferrihydrite slurry realizes a six-cycle loss of not greater than 34%. In yet another embodiment, a ferrihydrite slurry realizes a six-cycle loss of not greater than 31%. In another embodiment, a ferrihydrite slurry realizes a six-cycle loss of not greater than 28%. In yet another embodiment, a ferrihydrite slurry realizes a six-cycle activity of not greater than 26%. In another embodiment, a ferrihydrite slurry realizes a six-cycle loss of not greater than 24%. In yet another embodiment, a ferrihydrite slurry realizes a six-cycle activity of not greater than 22%. In another embodiment, a ferrihydrite slurry realizes a six-cycle loss of not greater than 20%, or less.

In one embodiment, a ferrihydrite slurry realizes a six-cycle capture efficiency (average) of at least 92%, when tested in accordance with the $H_2S$ Capture Procedure (defined below). In another embodiment, a ferrihydrite slurry realizes a six-cycle capture efficiency (average) of at least 93%. In yet another embodiment, a ferrihydrite slurry realizes a six-cycle capture efficiency (average) of at least 94%. In another embodiment, a ferrihydrite slurry realizes a six-cycle capture efficiency (average) of at least 95%. In yet another embodiment, a ferrihydrite slurry realizes a six-cycle capture efficiency (average) of at least 96%. In another embodiment, a ferrihydrite slurry realizes a six-cycle capture efficiency (average) of at least 97%. In yet another embodiment, a ferrihydrite slurry realizes a six-cycle capture efficiency (average) of at least 98%, or higher.

In one embodiment, a ferrihydrite slurry realizes a six-cycle standard deviation of not greater than 1.75%, when tested in accordance with the $H_2S$ Capture Procedure (defined below), where the standard deviation is calculated over a ferrihydrite activity of 0.2 to 0.8 for each capture cycle. In another embodiment, a ferrihydrite slurry realizes a six-cycle standard deviation of not greater than 1.50%. In yet another embodiment, a ferrihydrite slurry realizes a six-cycle standard deviation of not greater than 1.25%. In another embodiment, a ferrihydrite slurry realizes a six-cycle standard deviation of not greater than 1.00%. In yet another embodiment, a ferrihydrite slurry realizes a six-cycle standard deviation of not greater than 0.90%. In another embodiment, a ferrihydrite slurry realizes a six-cycle standard deviation of not greater than 0.80%. In yet another embodiment, a ferrihydrite slurry realizes a six-cycle standard deviation of not greater than 0.70%. In another embodiment, a ferrihydrite slurry realizes a six-cycle standard deviation of not greater than 0.60%. In yet another embodiment, a ferrihydrite slurry realizes a six-cycle standard deviation of not greater than 0.50%. In another embodiment, a ferrihydrite slurry realizes a six-cycle standard deviation of not greater than 0.40%. In yet another embodiment, a ferrihydrite slurry realizes a six-cycle standard deviation of not greater than 0.30%. In another embodiment, a ferrihydrite slurry realizes a six-cycle standard deviation of not greater than 0.25%, or less.

In one approach, a ferrihydrite slurry has high activity over six capture cycles. In one embodiment, at least three capture cycles of the six capture cycles realize a slurry activity of at least 1.0, when tested in accordance with the $H_2S$ Capture Procedure (defined below). In another embodiment, at least four cycles of the six capture cycles realize a slurry activity of at least 1.0. In yet another embodiment, at least five cycles of the six capture cycles realize a slurry activity of at least 1.0. In another embodiment, all six capture cycles realize a slurry activity of at least 1.0.

Some non-limiting ferrihydrite slurry performance embodiments are provided in Table 1, below, which embodiments generally relate to a batch-mode performance. A ferrihydrite slurry operated in a continuous mode environment (e.g., in accordance with FIG. 4d, or similar) may realize any one of these ferrihydrite slurry performance embodiments, if such a slurry were operated in batch-mode.

TABLE 1

Non-Limiting Ferrihydrite Slurry Performance Embodiments

| Embodiment | Six-Cycle Activity | Six-Cycle Loss | Six-Cycle Capture Efficiency (average) | Six-Cycle Standard Deviation | Cycles at or above 1.0 in Activity |
|---|---|---|---|---|---|
| 1 | ≥6.0 | ≤45% | ≥92% | ≤1.75% | ≥3 |
| 2 | ≥6.0 | ≤45% | ≥93% | ≤1.50% | ≥3 |
| 3 | ≥6.0 | ≤45% | ≥93% | ≤1.00% | ≥3 |
| 4 | ≥6.2 | ≤40% | ≥93% | ≤1.00% | ≥4 |
| 5 | ≥6.4 | ≤37% | ≥93% | ≤1.00% | ≥4 |
| 6 | ≥6.6 | ≤34% | ≥93% | ≤1.00% | ≥4 |
| 7 | ≥6.8 | ≤31% | ≥93% | ≤0.90% | ≥4 |
| 8 | ≥7.0 | ≤31% | ≥93% | ≤0.90% | ≥5 |
| 9 | ≥7.2 | ≤31% | ≥94% | ≤0.80% | ≥5 |
| 10 | ≥7.4 | ≤31% | ≥94% | ≤0.80% | ≥5 |
| 11 | ≥7.5 | ≤31% | ≥94% | ≤0.80% | All Six |
| 12 | ≥7.6 | ≤31% | ≥94% | ≤0.80% | All Six |
| 13 | ≥7.7 | ≤31% | ≥94% | ≤0.80% | All Six |
| 14 | ≥7.8 | ≤31% | ≥94% | ≤0.80% | All Six |
| 15 | ≥7.9 | ≤31% | ≥94% | ≤0.80% | All Six |
| 16 | ≥8.0 | ≤31% | ≥95% | ≤0.70% | All Six |
| 17 | ≥8.1 | ≤31% | ≥95% | ≤0.70% | All Six |
| 18 | ≥8.2 | ≤28% | ≥95% | ≤0.60% | All Six |
| 19 | ≥8.3 | ≤26% | ≥95% | ≤0.60% | All Six |
| 20 | ≥8.4 | ≤24% | ≥96% | ≤0.50% | All Six |
| 21 | ≥8.5 | ≤22% | ≥97% | ≤0.40% | All Six | iii. Types of Polluted Sulfur-Containing Fluids

The ferrihydrite slurries described herein may be useful in treating a variety of polluted sulfur-containing fluids, such as polluted fluids containing any of $H_2S$, COS, $CS_2$, or mercaptans. In one embodiment, the polluted sulfur-containing fluid comprises natural gas. In another embodiment, the polluted sulfur-containing fluid comprises syngas. In another embodiment, the polluted sulfur-containing fluid comprises biogas. In another embodiment, a polluted sulfur-containing fluid comprises sour water. In another embodiment, a polluted sulfur-containing fluid comprises sour crude oil. In another embodiment, a polluted sulfur-containing fluid comprises off-gas (e.g., for odor control). In yet another embodiment, a polluted sulfur-containing fluid comprises geothermal condensate (e.g., from a geothermal powerplant).

E. Cartridges

In one embodiment, the ferrihydrite slurries described herein may be used in a cartridge so as to facilitate rapid replacement in a sulfur treatment system employing the ferrihydrite slurries. In one embodiment, a method may include (a) preparing a replacement cartridge containing a fresh ferrihydrite slurry, as described herein, (b) shipping the replacement cartridge to an $H_2S$ (or other sulfur impurity) scrubber, wherein the $H_2S$ scrubber is located remote of the preparing step, (c) removing a used or spent cartridge from the $H_2S$ scrubber, (d) inserting the replacement cartridge in the $H_2S$ scrubber, (e) flowing a polluted fluid having $H_2S$ into the replacement cartridge, and (f) removing at least some of the $H_2S$ from the polluted fluid at least via the ferrihydrite nanoparticles of the replacement cartridge. In this regard, and as noted above, such a method may include discharging a treated fluid from the replacement cartridge, wherein the treated fluid comprises at least 90% less $H_2S$ than the polluted fluid (e.g., 99% less, or higher). As it relates to regeneration, the method may also include the steps of stopping the flowing step (e), and regenerating the ferrihydrite nanoparticles of the replacement cartridge, wherein the regenerating comprises flowing a gas comprising oxygen (e.g., ambient air) into the replacement cartridge. The method may further include the step of, after the regenerating step, initiating the flowing step (e), and then repeating the discharging, stopping, regenerating, and initiating steps at least five times, wherein, the cartridge realizes a six-cycle activity of at least 6.0, a six-cycle loss of not greater than 45%, a six-cycle capture efficiency (average) of at least 92%, a six-cycle standard deviation of not greater than 1.75, and where at least three cycles of the six capture cycles realize an activity of at least 1.0, (such as any of the embodiments described in Table 1, above). The cartridges described herein are not limited to any size, and may be of a size and configuration to hold any suitable volume of ferrihydrite slurry, depending on application. For instance, the cartridges may be sized to hold a few ounces of slurry, or less (e.g., for use in a lab-scale operation), or the cartridges may be sized to hold 10,000 gallons of slurry, or more, (e.g., for use in an industrial/production setting).

F. Continuous Operation Via Dual Column Arrangements i. Lead-Lag Continuous Embodiment Referring now to FIG. 4c, a first continuous treatment arrangement is illustrated. In the illustrated embodiment, continuous treatment of a polluted sulfur-containing fluid stream (450) may be facilitated using a dual column (lead-lag) type arrangement, where a first slurry column (10a) having a first batch of ferrihydrite slurry (400a) and a second slurry column (10b) having a second batch of ferrihydrite slurry (400b) are alternated to treat the polluted sulfur-containing fluid stream (450). In particular, a polluted sulfur-containing stream (450) may be provided (e.g., via one or more knockout drums (475)), after which the polluted sulfur-containing stream (450) may be provided to the first slurry column (10a) via a series of valves (600) and piping, wherein the polluted sulfur-containing stream (450) is treated via the first ferrihydrite slurry (400a), as described above. A treated fluid stream (500) may be discharged from the first slurry column (10a). When the first ferrihydrite slurry (400a) approaches slurry breakthrough, or is at slurry breakthrough, the valves (600) may be adjusted to switch the flow of the polluted sulfur-containing stream (450) to the second column (10b) having the second ferrihydrite slurry (400b), thereby facilitating continued treatment of the polluted sulfur-containing stream (450) and continued discharge of the treated fluid stream (500). While the second column (10b) is being used to treat the polluted sulfur-containing stream (450), the first ferrihydrite slurry (400a) may be regenerated by providing an air stream (455) to the first column (10a) via blower (459), valves (600) and piping. When the second ferrihydrite slurry (400b) approaches or is at slurry breakthrough, the valves (600) may be adjusted to switch the flow of the polluted sulfur-containing stream (450) back to the first column (10a) having the regenerated first ferrihydrite slurry (400a), thereby facilitating continued treatment of the polluted sulfur-containing stream (450) and continued discharge of the treated fluid stream (500). Likewise, while the first column (10a) is being used to treat the polluted sulfur-containing stream (450), the second ferrihydrite slurry (400b) may be regenerated by providing the air stream (455) to the second column (10b) via blower (459), valves (600) and piping. The first and second ferrihydrite slurries (400a, 400b) may be utilized until they are no longer suitable for treatment of the polluted sulfur-containing stream (450), after which a used or spent ferrihydrite slurries may be replaced, such as by discharging the applicable used ferrihydrite slurry through an appropriate drain (not shown), and then introducing a fresh ferrihydrite slurry into the applicable column (10a, 10b). In another approach, the cartridges, described above, may be used in the columns (10a, 10b), to facilitate rapid replacement of the used or spent ferrihydrite slurry with the fresh ferrihydrite slurry. In either event, the used ferrihydrite slurries may be replaced in alternating fashion (in series) so as to facilitate continuous treatment of the polluted sulfur-containing stream (450).

In the lead-lag embodiments described above, or in a similar batch-mode apparatus, the ferrihydrite slurry may be exposed to the polluted sulfur-containing fluid stream until breakthrough is nearly reached (e.g., up to 90% of breakthrough). However, it has been found that exposing a ferrihydrite slurry to a polluted sulfur-containing fluid for a period up to or close to breakthrough may degrade the lifetime of the ferrihydrite slurry. Thus, in some embodiments, a ferrihydrite slurry (e.g., as used in lead-lag columns (10a, 10b) or in a similar batch-mode apparatus) is exposed to a polluted sulfur-containing fluid stream until it reaches about three-quarters (¾), or less, of its breakthrough capacity, after which the exposure ceases, and the ferrihydrite slurry is regenerated, if appropriate. In one embodiment, a ferrihydrite slurry is exposed to a polluted sulfur-containing fluid stream until about two-thirds (⅔), or less, of its breakthrough capacity, after which the exposure ceases, and the ferrihydrite slurry is regenerated, if appropriate. In one embodiment, the ferrihydrite slurry is operated to at least one-seventh (⅐), or more, of its breakthrough capacity. In another embodiment, a ferrihydrite slurry is operated to at least one-quarter (¼), or more, of its breakthrough capacity. In another embodiment, a ferrihydrite slurry is operated to at least one-third (⅓), or more, of its breakthrough capacity. In another embodiment, a ferrihydrite slurry is operated to at least one-half (½), or more, of its breakthrough capacity.

ii. Recirculating Continuous Embodiment

Referring now to FIG. 4d, a second continuous treatment arrangement for treating a polluted sulfur-containing fluid stream (450) is illustrated. In the illustrated embodiment, the continuous treatment may be facilitated using a dual column type arrangement, where the columns (10a and 10b) contain at least some ferrihydrite slurry (400a). In the illustrated embodiment, the first column (10a) is used to treat the polluted sulfur-containing fluid stream (450), and the second column (10b) is used to regenerate the ferrihydrite slurry (400a), wherein the ferrihydrite slurry (400a) is recirculated between the two columns (10a, 10b) during operation. In particular, a polluted sulfur-containing stream (450) may be provided to the first column (e.g., via one or more knockout drums (475), which knockout drums (475) may facilitate gas-liquid separation of the incoming polluted stream (450)). The polluted stream (450) is provided to the first column (10a), and sulfur therein interacts with the ferrihydrite particles of the ferrihydrite slurry (400a), as provided above, thereby removing sulfur from the polluted stream (450). A treated stream (500) is thus discharged from the first column. The treated stream (500) may have a significantly lower amount of sulfur as compared to the incoming polluted stream (450), such as any of the removal efficiencies and/or ppm levels described below. Concomitantly, a blower (455) blows air stream (459) (or other suitable oxygen-containing fluid stream) into the second column (10b), thereby regenerating ferrihydrite particles of the ferrihydrite slurry (400a) in the second column (10b). This air stream (459) may be provided continuously or intermittently to the second column. Pumps (615a, 615b) may intermittently or continuously transfer the ferrihydite slurry (400a) between the first column (10a) and the second column (10b) during operation.

The produced elemental sulfur generated in the second column (10b) may be removed as stream (510), and via any suitable industrial solid-liquid separation practice, such as, for example, filtration, flotation (e.g., froth flotation), or settling, or combinations thereof. In one embodiment, a frothing agent may be added (e.g., intermittently) to assist with the sulfur removal (e.g., to assist with flotation), e.g., a polyglycol. In one embodiment, a settling agent may be added to facilitate with the sulfur removal (e.g., to assist with settling), such as a flocculant or surfactant. Organic agents generally immiscible with water (e.g., toluene, xylene) may also/alternatively be used (e.g., for interacting with the elemental sulfur). These sulfur removal techniques may also be used in the lead-lag system, described above. The sulfur stream (510) generally will contain elemental sulfur and some water, but may also contain iron materials, and may contain additional materials contained in the incoming polluted stream.

In one approach, the air stream (459) is also provided (e.g., intermittently, continuously) to the first column (10a) to facilitate regeneration of ferrihydrite particles and/or production of elemental sulfur. In this approach, any elemental sulfur contained in the first column (10a) may be removed as described above relative to the second column (10b).

As noted above, circulation of the slurry between the first and the second columns (10a, 10b) may be continuous or intermittent. In one embodiment, the circulation is continuous recirculation. The circulation may maintain the volume of ferrihydrite slurry in each column. For instance, the circulation may maintain a first volume of ferrihydrite slurry in the first column (10a), and maintain a second volume of ferrihydrite slurry in the second column (10b), the first and second volumes, wherein the total volume of the ferrihydrite slurry equals the sum of these first and second volumes. Make-up ferrihydrite stream (not illustrated) may be provided, as necessary, to one of or both of the first and second columns (10a, 10b), as needed to facilitate having an appropriate total volume of ferrihydrite slurry in the system.

As noted above air stream (459) may be provided continuously or intermittently to the second column (10b). The air stream (459) may also be provided continuously or intermittently to the first column (10a). Providing air to the first column (10a) (e.g., intermittently) may facilitate improved ferrihydrite slurry lifetimes.

While both the lead-lag system (FIG. 4c) and the continuous recirculation system (FIG. 4d) are illustrated with only two columns, any number of columns may be used to facilitate continuous treatment.

iii. Recirculation Continuous Mode Removal Capabilities

As described previously, the performance of a system employing a ferrihydrite slurry in a batch mode setting (e.g., in a lead-lag system, or another batch-mode apparatus) may be characterized as per Section (D)(ii), above. The performance of a ferrihydrite slurry operating in a continuously recirculating system (e.g., in accordance with FIG. 4d, or similar) may likewise be characterized by operating the system in batch mode, using fresh ferrihydrite slurry, to test performance. Alternatively, the performance of a ferrihydrite slurry operating in a continuously recirculating system may be characterized by the amount of sulfur discharged in the treated stream (500) over the life of the ferrihydrite slurry. In one approach, the discharged treated stream (500) contains at least 90% less sulfur as compared to the corresponding inlet concentration of the polluted sulfur-containing fluid stream (450) during the life of the ferrihydrite slurry (e.g., a life of from $1/7^{th}$ to $3/4$ of breakthrough), depending on the setting in which the system is used (e.g., natural gas treatment, biogas treatment, geothermal stream treatment). In one embodiment, the discharged treated stream (500) contains at least 95% less sulfur as compared to the corresponding inlet concentration of the polluted sulfur-containing fluid stream (450) during the life of the ferrihydrite slurry. In another embodiment, the discharged treated stream (500) contains at least 98% less sulfur as compared to the corresponding inlet concentration of the polluted sulfur-containing fluid stream (450) during the life of the ferrihydrite slurry. In yet another embodiment, the discharged treated stream (500) contains at least 99% less sulfur as compared to the corresponding inlet concentration of the polluted sulfur-containing fluid stream (450) during the life of the ferrihydrite slurry. In another embodiment, the discharged treated stream (500) contains at least 99.9% less sulfur as compared to the corresponding inlet concentration of the polluted sulfur-containing fluid stream (450) during the life of the ferrihydrite slurry. In yet another embodiment, the discharged treated stream (500) contains at least 99.99% less sulfur as compared to the corresponding inlet concentration of the polluted sulfur-containing fluid stream (450) during the life of the ferrihydrite slurry. In another embodiment, the discharged treated stream (500) contains at least 99.999% less sulfur, or more, as compared to the corresponding inlet concentration of the polluted sulfur-containing fluid stream (450) during the life of the ferrihydrite slurry. In any of these approaches or embodiments, the discharged fluid stream may contain low levels of sulfur (e.g., low levels of $H_2S$, COS, $CS2$, mercaptans, in total), such as not greater than 3000 ppm (max.) of total sulfur, depending on the type of polluted sulfur-containing fluid stream being treated. For instance, the discharged fluid stream may contain greater than 2000 ppm (max.) of total sulfur. In one embodiment, the discharged fluid stream contains not greater than 1000 ppm of total sulfur. In another embodiment, the discharged fluid stream contains not greater than 500 ppm (max.) of total sulfur. In yet another embodiment, the discharged fluid stream contains not greater than 250 ppm (max.) of total sulfur. In another embodiment, the discharged fluid stream contains not greater than 100 ppm (max.) of total sulfur. In yet another embodiment, the discharged fluid stream contains not greater than 50 ppm (max.) of total sulfur. In another embodiment, the discharged fluid stream contains not greater than 25 ppm (max.) of total sulfur. In yet another embodiment, the discharged fluid stream contains not greater than 10 ppm (max.) of total sulfur. In another embodiment, the discharged fluid stream contains not greater than 5 ppm (max.) of total sulfur. In yet another embodiment, the discharged fluid stream contains not greater than 4 ppm (max.) of total sulfur. In another embodiment, the discharged fluid stream contains not greater than 3 ppm (max.) of total sulfur. In yet another embodiment, the discharged fluid stream contains not greater than 2 ppm (max.) of total sulfur. In another embodiment, the discharged fluid stream contains not greater than 1 ppm (max.) of total sulfur. In yet another embodiment, the discharged fluid stream contains not greater than 0.5 ppm (max.) of total sulfur. In another embodiment, the discharged fluid stream contains not greater than 0.1 ppm (max.) of total sulfur. In yet another embodiment, the discharged fluid stream contains not greater than 0.05 ppm (max.) of total sulfur. In another embodiment, the discharged fluid stream contains not greater than 0.01 ppm (max.) of total sulfur. In yet another embodiment, the discharged fluid stream contains not greater than 0.005 ppm (max.) of total sulfur, or less.

In one approach, the continuous recirculation system (e.g., in accordance with FIG. 4d, or similar) treats a polluted natural gas stream, and the continuous recirculation system discharges a treated gas stream compliant with applicable natural gas pipeline sulfur requirements (e.g., $H_2S$ requirements), and over the life of the ferrihydrite slurry. For instance, in North America (and potentially elsewhere) the continuous recirculation system treats a polluted natural gas stream, and discharges a treated gas stream having not greater than 4 ppm (max.) $H_2S$ over the life of the ferrihydrite slurry.

G. Use of Raw Ferrihydrite Particles

As noted above, the ferrihydrite slurries are preferably produced by precipitating ferrihydrite nanoparticles via iron ions of an aqueous solution, and leaving the precipitated nanoparticles in solution. However, it is anticipated that other methods of producing ferrihydrite slurries may also have value relative to treatment of polluted sulfur-containing fluids. For instance, raw ferrihydrite particles (two-line iron particles, lepidocrocite particles, and combinations thereof) may be simply added to water to produce a ferrihydrite slurry. The particles should be finely ground to facilitate high available surface area.

H. Definitions

As used herein, "iron salt" means a salt of either ferric ($3^+$) or ferrous ($2^+$) iron.

As used herein, "nanoparticles" means particles generally smaller than 500 nanometers. As used herein, "iron nanoparticles" means nanoparticles having at least some ferric iron therein. The iron nanoparticles may contain, for instance, oxygen and hydrogen. In one embodiment, the iron nanoparticles are ferrihydrite nanoparticles. Ferrihydrite nanoparticles made in accordance with the present patent application may have a median size ($D_{50}$) of from about 10 nanometers to 60 nanometers and a surface area of from about 200 to 300 $m^2/g$ as determined by $N_2$ BET isotherm analysis.

As used herein, "ferric oxides" means a ferric oxide material or a ferric oxyhydroxide material. Ferric oxides include two-line iron, lepidocrocite, akaganeite, goethite, hematite, and magnetite.

As used herein, "ferrihydrite" means the two-line iron form or the lepidocrocite form of ferric oxides.

As used herein, "ferrihydrite nanoparticles" means a volume of nanoparticles having two-line iron nanoparticles therein, lepidocrocite nanoparticles therein, or combinations of two-line iron nanoparticles and lepidocrocite nanoparticles therein.

As used herein, "ferrihydrite slurry" means an aqueous slurry having ferrihydrite nanoparticles therein. A ferrihydrite slurry generally contains a sufficient amount of the two-line iron species and/or lepidocrocite species of the ferrihydrite nanoparticles to treat a polluted sulfur-containing fluid. The ferrihydrite slurry may include a sufficient amount of a 2LI promoter and/or halide anions to facilitate multiple regeneration cycles, wherein two-line iron nanoparticles and/or lepidocrocite nanoparticles are regenerated by exposure to an oxidizing material (e.g., air).

As used herein, "slurry" means an aqueous solution comprising nanoparticles. For the purposes of the present patent application, "slurry" and "suspension" are synonymous.

As used herein, "fresh ferrihydrite slurry" means a ferrihydrite slurry that has yet to treat a polluted sulfur-containing fluid. A fresh ferrihydrite slurry may comprise fresh ferrihydrite nanoparticles. "Fresh ferrihydrite nanoparticles" are precipitated ferrihydrite nanoparticles of the fresh ferrihydrite slurry that have yet to interact with a sulfur pollutant of a polluted sulfur-containing fluid.

As used herein, "slurry activity" or "ferrihydrite slurry activity" means the moles of sulfur captured per mole of iron of a batch of ferrihydrite slurry over a single capture cycle when tested in accordance with the "$H_2S$ Capture Procedure" described below. As used herein, "cumulative slurry activity" or "cumulative ferrihydrite slurry activity" means the moles of sulfur captured per mole of iron of the batch of ferrihydrite slurry over multiple cycles.

As used herein, "slurry breakthrough" means a decrease in capture efficiency of 10% over a change in slurry activity (S:Fe ratio) of 0.1, i.e., the point at which a ferrihydrite slurry realizes a "capture efficiency slope" of −100, or lower, per unit of ferrihydrite slurry activity and over a ferrihydrite slurry activity period (span) of at least 0.1 unit, when tested in accordance with the "$H_2S$ Capture Procedure" described below. For instance, in FIG. 5c the slurry breakthrough for Cycle 6 occurs at approximately a ferrihydrite slurry activity of 1.24.

As used herein "capture efficiency slope" means the linear slope of a line having ferrihydrite slurry capture efficiency as the Y-axis and ferrihydrite slurry activity as the X-axis.

As used herein, "a capture cycle" means the period of time starting when a batch of ferrihydrite slurry is exposed to a polluted sulfur-containing fluid and continuing until the ferrihydrite slurry reaches slurry breakthrough. The ferrihydrite slurry may be regenerated into a regenerated ferrihydrite slurry after a capture cycle. Shorter capture cycles (i.e., not to breakthrough) may be used in a production environment, but a "capture cycle" used to determine "capture efficiency" and other metrics of a batch of ferrihydrite slurry (as described herein) are operated to breakthrough.

As used herein, "capture efficiency" or "ferrihydrite slurry capture efficiency" means the percent of sulfur pollutant (e.g., $H_2S$) of a sulfur-containing fluid that is captured relative to the total sulfur in the sulfur-containing fluid (i.e., S captured/total S in the sulfur-containing fluid) as a result of being exposed to a batch of ferrihydrite slurry, when tested in accordance with the "$H_2S$ Capture Procedure" described below. As shown in the below Examples, capture efficiency can be plotted as a function of ferrihydrite slurry activity.

As used herein, "average capture efficiency" or "average ferrihydrite slurry capture efficiency" is the mean ferrihydrite slurry capture efficiency over a capture cycle, using the mean value theorem:

$$f(x)_{ave} = \frac{1}{b-a}\int_a^b f(x)dx$$

where f(x) is ferrihydrite slurry capture efficiency, and x is ferrihydrite slurry activity. For each capture cycle, the above integral is approximated using the trapezoidal rule:

$$\int_a^b f(x)dx \approx \frac{1}{2}\sum_{k=1}^{N}(x_{k+1}-x_k)(f(x_{k+1})+f(x_k)).$$

As used herein, "capture efficiency standard deviation" or "ferrihydrite slurry capture efficiency standard deviation" is the standard deviation of the average capture efficiency. Standard deviation is calculated using the below equation, where N is the population size, $x_i$ is the capture efficiency of the individual value, and $\mu$ is the average capture efficiency.

$$\sqrt{\frac{1}{N}*\sum_{i=1}^{N}(x_i-\mu)^2}$$

In Examples 2-9, below, the capture efficiency standard deviation is calculated over a slurry activity period of 0.20 to 0.80.

As used herein, "six-cycle activity" means the cumulative ferrihydrite slurry activity of a batch of ferrihydrite slurry over six capture cycles, the batch of ferrihydrite slurry being regenerated into a regenerated ferrihydrite slurry after each capture cycle.

As used herein, "six-cycle loss" means the cumulative percentage loss of a batch of ferrihydrite slurry activity over six cycles (i.e., ((cycle 1 ferrihydrite slurry activity)–(cycle 6 ferrihydrite slurry activity))/(cycle 1 ferrihydrite slurry activity). For instance, for a cycle 1 ferrihydrite slurry activity of 1.50 and a cycle 6 ferrihydrite slurry activity of 1.27, a ferrihydrite slurry would have a "six-cycle loss" of 15.33% ((1.5–1.27)/1.5=0.1533).

As used herein, "six-cycle capture efficiency (average)" means the average ferrihydrite slurry capture efficiency of a batch of ferrihydrite slurry over six capture cycles, the batch of ferrihydrite slurry being regenerated into a regenerated ferrihydrite slurry after each capture cycle. The six-cycle capture efficiency (average) is the sum of the mean value theorem integral for each of the six capture cycles, divided by the six-cycle activity.

As used herein, "six-cycle standard deviation" means the cumulative ferrihydrite slurry standard deviation of a batch of ferrihydrite slurry over six capture cycles.

As used herein, "used ferrihydrite slurry" means a ferrihydrite slurry that has been exposed to a polluted sulfur-containing fluid for a time sufficient to produce at least some ferrihydrite slurry activity, such as a ferrihydrite slurry activity of at least 0.10. In one embodiment, a used ferrihydrite slurry has been exposed to a polluted sulfur-containing fluid for a ferrihydrite slurry activity of at least 0.2. In another embodiment, a used ferrihydrite slurry has been exposed to a polluted sulfur-containing fluid for a ferrihydrite slurry activity of at least 0.3. In yet another embodiment, a used ferrihydrite slurry has been exposed to a polluted sulfur-containing fluid for a ferrihydrite slurry activity of at least 0.4. In another embodiment, a used ferrihydrite slurry has been exposed to a polluted sulfur-containing fluid for a ferrihydrite slurry activity of at least 0.5. In yet another embodiment, a used ferrihydrite slurry has been exposed to a polluted sulfur-containing fluid for a ferrihydrite slurry activity of at least 0.6. In another embodiment, a used ferrihydrite slurry has been exposed to a polluted sulfur-containing fluid for a ferrihydrite slurry activity of at least 0.7, or more. A "used ferrihydrite slurry" contains spent ferrihydrite nanoparticles.

"Spent ferrihydrite nanoparticles" means iron-containing nanoparticles (whether ferrihydrite-style, or otherwise) having reduced or no activity relative to sulfur constituents in a ferrihydrite slurry (e.g., due to ferrihydrite particles having contact with/reacting with sulfur of a polluted sulfur-containing fluid stream).

As used herein, "spent ferrihydrite slurry" means a ferrihydrite slurry that has achieved slurry breakthrough. A "spent ferrihydrite slurry" contains spent ferrihydrite nanoparticles.

As used herein, "regenerated ferrihydrite slurry" means a used or spent ferrihydrite slurry that has been regenerated via exposure to an oxidizing material (e.g., via exposure to air). A regenerated ferrihydrite slurry comprises regenerated ferrihydrite nanoparticles.

As used herein, "regenerated ferrihydrite nanoparticles" are ferrihydrite nanoparticles that have been regenerated from the used or spent ferrihydrite slurry. The regenerated ferrihydrite nanoparticles of the regenerated ferrihydrite slurry may be regenerated via exposure to an oxidizing material (e.g., via exposure to air). The regenerated ferrihydrite nanoparticles may have renewed activity towards one or more sulfur species.

As used herein, "two-line iron" means a ferric oxyhydroxide material that, when examined by XRD, generally presents two peaks over 10 to 90 degrees (2Θ(theta)) using a cobalt source (1.79 Å(angstrom) k-alpha), and where each peak has a spread of at least 4 degrees 2theta, full width at half max (FWHM). Some two-line iron nanoparticles may show a first peak at about 38-43 degrees (2Θ) and a second peak at about 71-77 degrees (2Θ) using a chromium source (1.79 Å(angstrom) k-alpha), and where each peak has a spread of at least 4 degrees 2theta, full width at half max (FWHM).

As used herein, "lepidocrocite" means a ferric oxyhydroxide material that, realizes an XRD Spectrum generally consistent with JCPDS card number 00-060-0344 and an IR spectrum containing characteristic peaks at 1019, 748, and 456 $cm^{-1}$.

As used herein, "akaganeite" means an iron oxide material that realizes an XRD spectrum generally consistent with JCPDS card number 00-060-0614 and an IR spectrum containing characteristic peaks at 825, 635, and 420 $cm^{-1}$.

As used herein, "goethite" means an iron oxide material that realizes an XRD spectrum generally consistent with JCPDS card number 04-015-8332 and an IR spectrum containing characteristic peaks at 906, 793, and 623 $cm^{-1}$.

As used herein, "hematite" means an iron oxide material that realizes an XRD spectrum generally consistent with JCPDS card number 01-076-8881 and an IR spectrum containing characteristic peaks at 519 and 435 $cm^{-1}$.

As used herein, "magnetite" means an iron oxide material that realizes an XRD spectrum generally consistent with JCPDS card number 04-009-8442 and an IR spectrum containing characteristic peaks at 969 and 532 $cm^{-1}$.

As used herein, "JCPDS card number" means the "Joint Committee on Powder Diffraction Standards" card associated with the given number. JCPDS card numbers can be located via powder x-ray diffraction software equipped with a license from the "International Centre for Diffraction Data" (www.iccdd.com) and an applicable inorganic materials database.

As used herein, "two-line iron promoter" or "2LI promoter" means a material added to an aqueous solution that preferentially promotes production of the two-line iron species of ferrihydrite nanoparticles in the aqueous solution (e.g., during their precipitation/the precipitating step), and/ or preferentially restricts degradation of the two-line iron species of ferrihydrite nanoparticles in the aqueous solution.

As used herein, "caustic" means a basic solution having hydroxide ions.

As used herein, "alkali caustic", means a caustic made from alkali metals (Group IA of the periodic table), such as alkali hydroxides (e.g., NaOH, KOH) and alkali carbonates (e.g., $Na_2CO_3$, $NaHCO_3$), for instance.

As used herein, "biogas" means any gas comprising hydrogen sulfide, methane and/or CO2 that was produced by biological degradation of organic matter."

$H_2S$ Capture Procedure

A ferrihydrite slurry is made as described herein. $H_2S$ gas is supplied to 20 mL of the ferrihydrite slurry via a compressed gas cylinder containing 10% by volume hydrogen sulfide in a balance of nitrogen and mixed with nitrogen to achieve an inlet concentration of approximately 2000 ppm $H_2S$. Mass flow controllers (e.g., by Alicat Scientific) are used to precisely control the inlet concentration at a total flow rate of 0.5 SLPM. Once mixed, the gases enter the bottom of a 3 foot tall, one-half inch Sch. 80 clear PVC bubble column and through an EPDM gasket sparger. The outlet hydrogen sulfide concentration is to be measured by a gas chromatograph (e.g., Shimadzu GC-14A) using a FPD detector and Agilent Hayesep Q 80-100 mesh column.

Fresh Slurry XRD Analysis Procedure
1. Produce fresh ferrihydrite slurry.
2. Filter the slurry using a glass microfiber filter (filter size of 0.3 micron) using vacuum filtration.
3. Wash the vacuum cake via deionized water with 50 mL of water per gram of particulate; repeat wash twice more.
4. Air dry the filtered and washed particulate, removed from filter, and then grind to a fine powder.
5. Analyze the fine powder via XRD using a cobalt source.

Regenerated Slurry XRD analysis procedure
1. Produce regenerated ferrihydrite slurry.
2. Dissolve any sulfur of the slurry by pouring hot toluene 70° C.) into the room temperature slurry and then stir the room temperature slurry vigorously (heat should not be applied to the slurry), after which the aqueous layer should be removed (e.g., via a separatory funnel). Repeat as necessary (e.g., at least two more times) until sulfur is removed.
3. Complete steps 2-5 of the Fresh Slurry XRD analysis procedure.

IR Spectrum Procedure
1. A fine iron oxide powder is provided as per either the fresh XRD or regenerated XRD analysis procedure, described above.
2. The "IR Spectrum" is the infrared absorbance of the iron oxide powder materials from item 1, above, under a force of 85 Newtons, measured with a Perkin Elmer Spectrum Two UATR FT-IR instrument, wherein the instrument and accompanied Perkin Elmer Spectrum program scans the solid 10 individual times to produce the spectrum. The IR Spectrum may be accompanied by an uncertainty in the peak locations by about +/−15 $cm^{-1}$.

BRIEF DESCRIPTION OF THE DRAWINGS

FIG. 5c is a graph showing the ferrihydrite slurry activity and capture efficiency for the ferrihydrite slurry of Example 1.

FIGS. 6-12 are graphs showing the ferrihydrite slurry activity and capture efficiency for the ferrihydrite slurries of Examples 3-9, respectively.

DETAILED DESCRIPTION

Example 1—Synthesis of a 1 wt. % Ferrihydrite Slurry Using Ferric Chloride and D-Sorbitol An aqueous slurry comprising 1 wt. % two-line iron, 0.05 mole of D-sorbitol and 3 mole of sodium chloride for every 1 mole of ferric iron was made by the following synthesis procedure. A total of 0.6 g of anhydrous D-sorbitol was added to 304.7 mL of deionized water, followed by the addition of 10.1 g of anhydrous ferric chloride. The resulting solution had a molar ratio of D-sorbitol to iron of about 1:20. Once the salt was dissolved and the solution cooled to ambient temperature, 1M sodium hydroxide at room temperature was added from a burette at a fast rate with stirring until the solution reached a pH of about 3. Additional sodium hydroxide was added at a slow dropwise rate until pH of about 7 was reached for a total sodium hydroxide addition of approximately 187.4 mL. The total time to reach pH 7 was approximately 30 minutes. An XRD analysis confirmed that the iron nanoparticles formed in this synthesis consist essentially of two-line iron nanoparticles. The two-line iron nanoparticles had an average surface area of about 306 $m^2/g$ as determined by BET ($N_2$) and a particle size less than 100 nanometers as determined by SEM.

Figure 1:
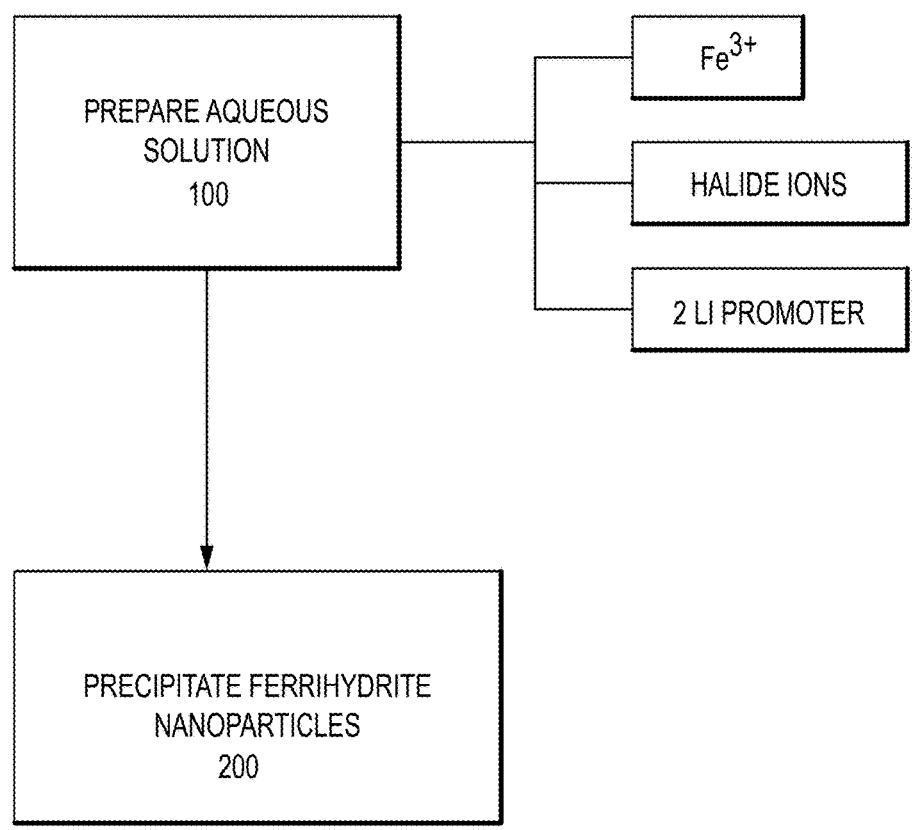
FIG. 1 is a schematic flow diagram of one embodiment of a method for producing a ferrihydrite slurry as described in this patent application.
Figure 2:
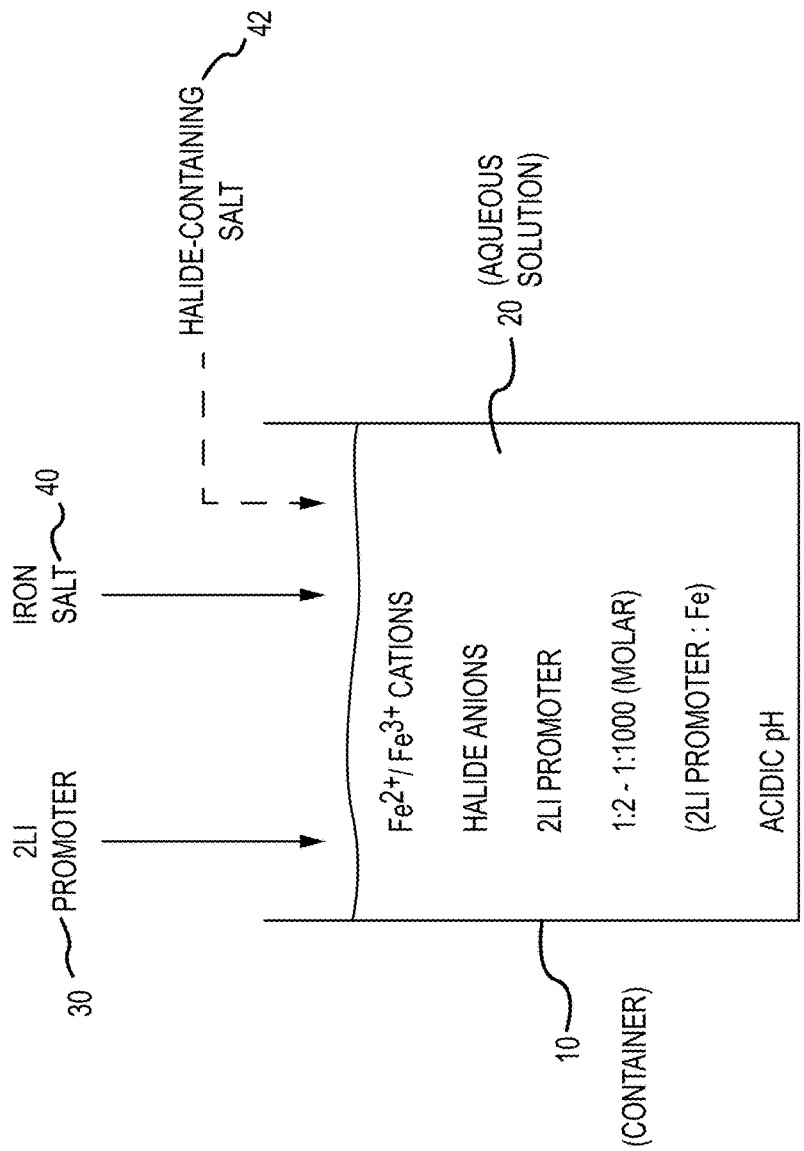
FIG. 2 is a schematic view of one method of producing an aqueous solution having ferric iron cations, 2LI promoter, and halide anions therein.
Figure 3:
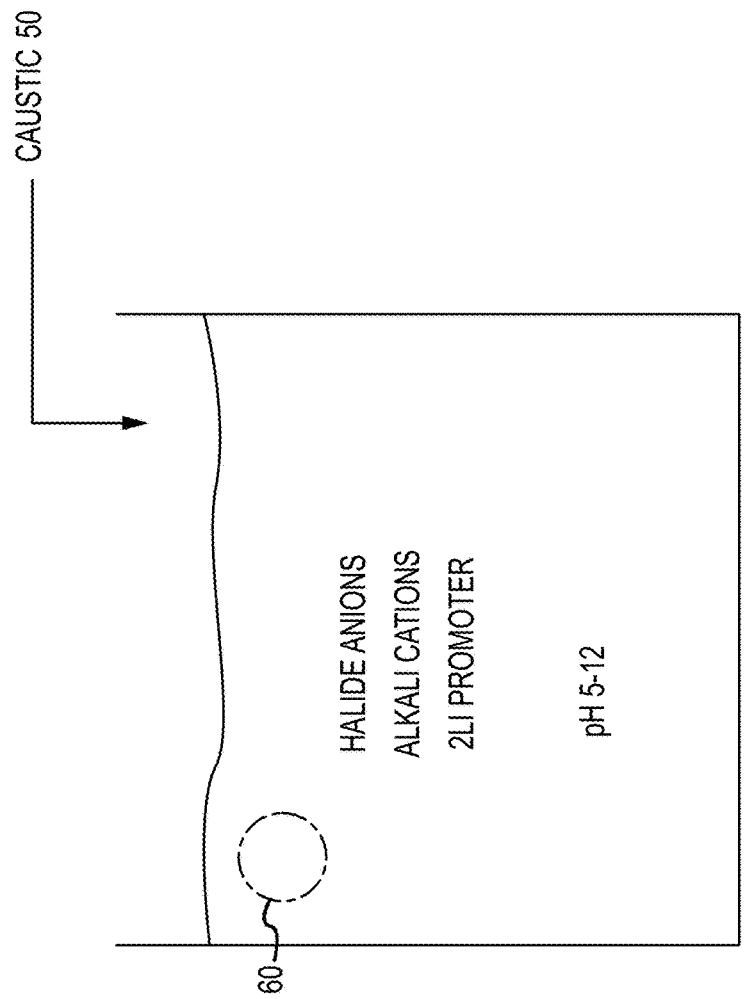
FIG. 3 is a schematic view of one method of precipitating ferrihydrite nanoparticles from the aqueous solution shown in FIG. 2.
Figure 4B:
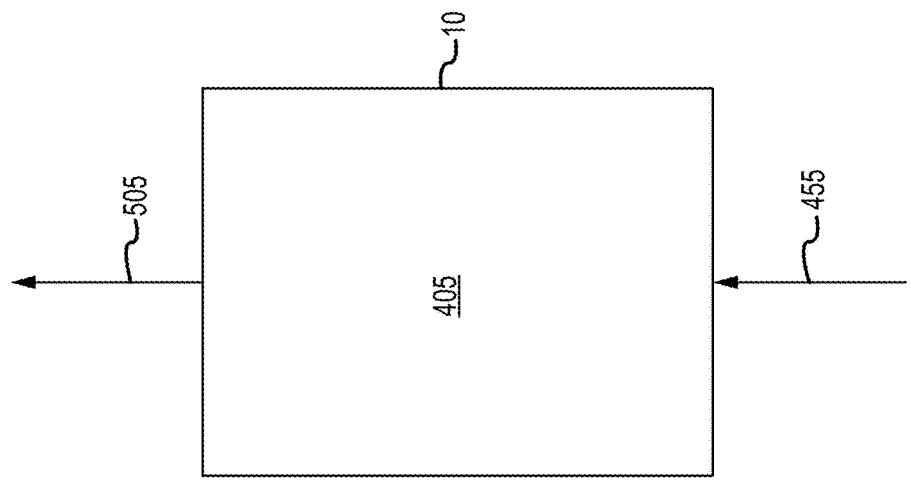
FIG. 4b is a schematic view of an arrangement for regenerating a used ferrihydrite slurry via an oxygen-containing fluid.
Figure 4A:
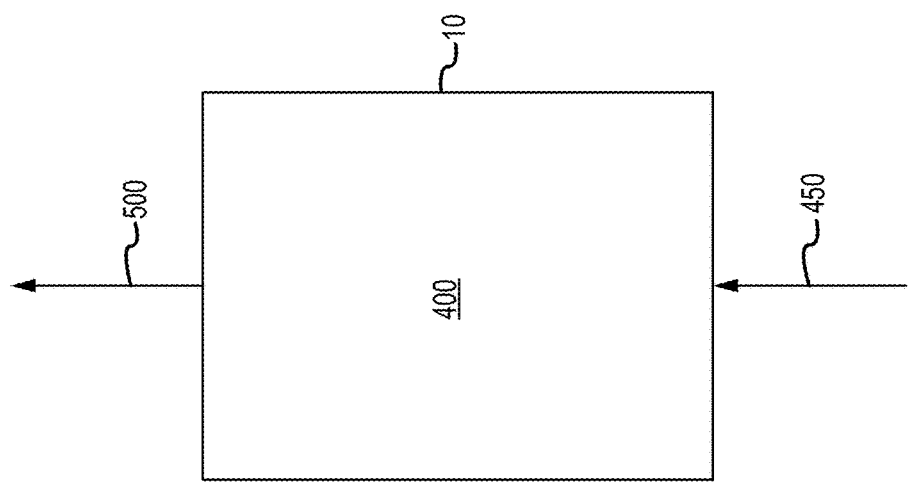
FIG. 4a is a schematic view of an arrangement for a ferrihydrite slurry to treat a polluted fluid.
Figure 4C:
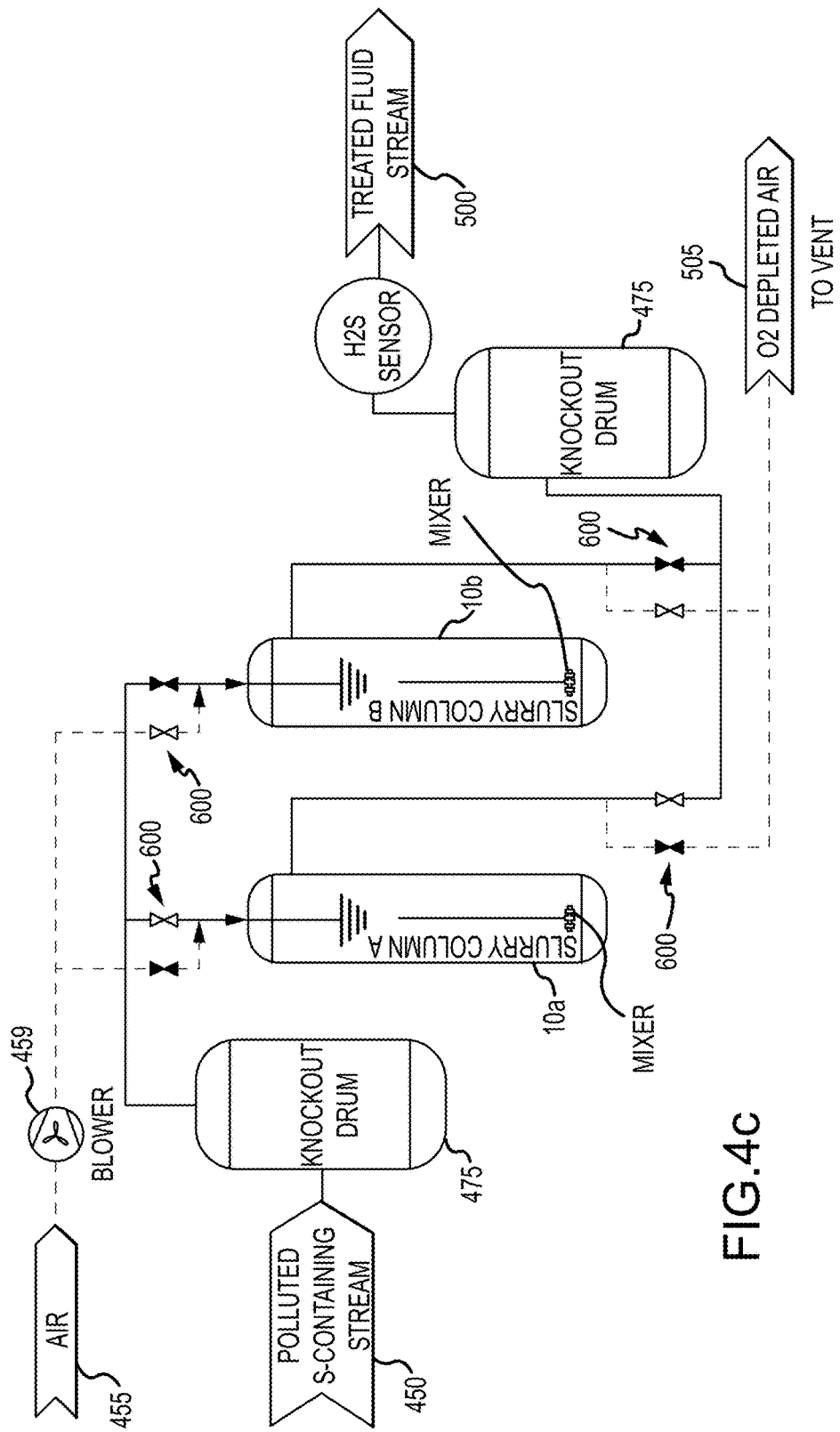
FIG. 4c is a schematic view of a dual column approach to using batches of ferrihydrite slurry so as to facilitate continuous treatment of a polluted sulfur-containing stream.
Figure 4D:
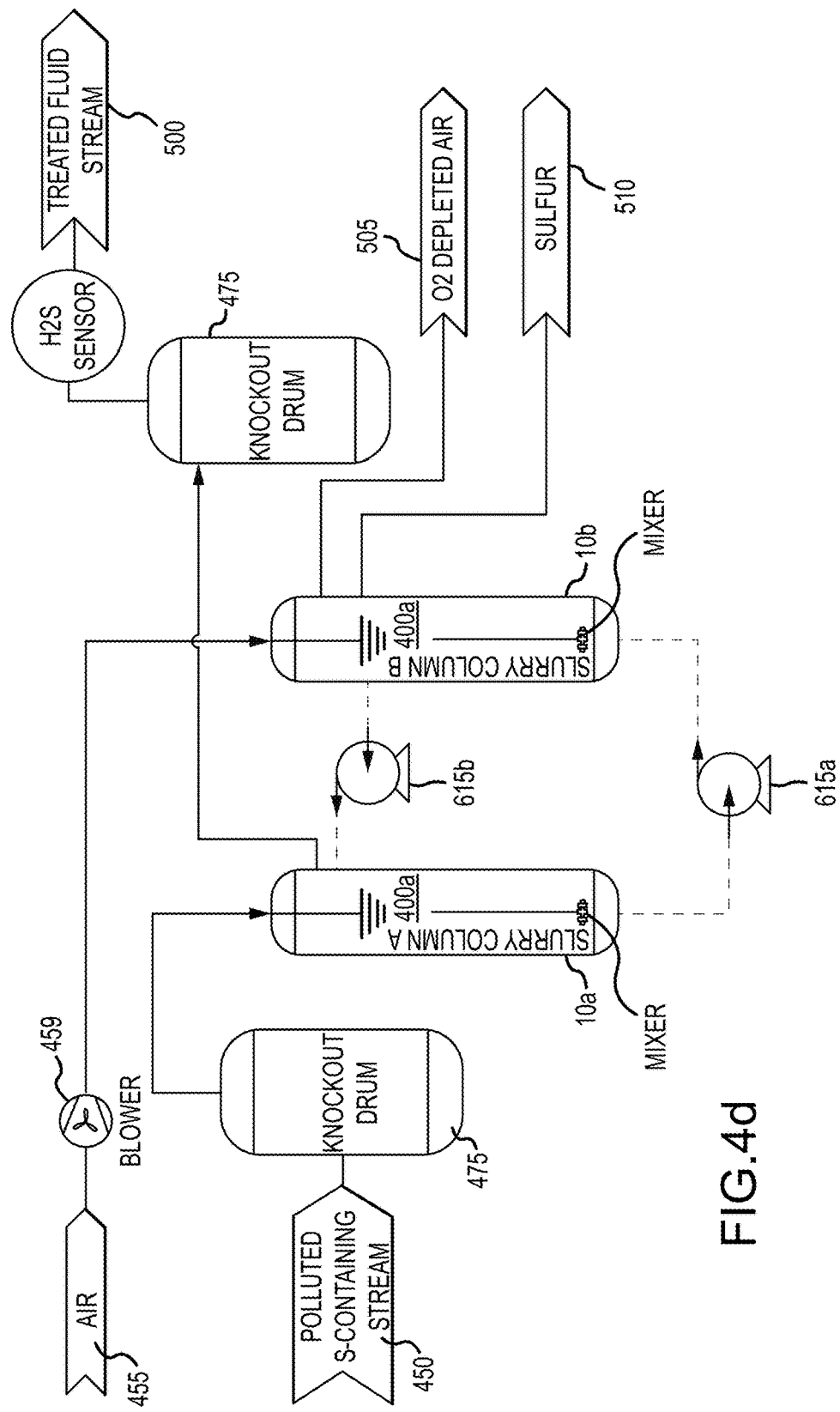
FIG. 4d is a schematic view of a dual column approach employing continuous recirculation so as to facilitate continuous treatment of a polluted sulfur-containing stream. The ferrihydrite slurry of FIG. 4d may be continuously regenerated.
Figure 5A:
FIGS. 5a-5b are SEMs of the ferrihydrite nanoparticles of Example 1.
Figure 5B:
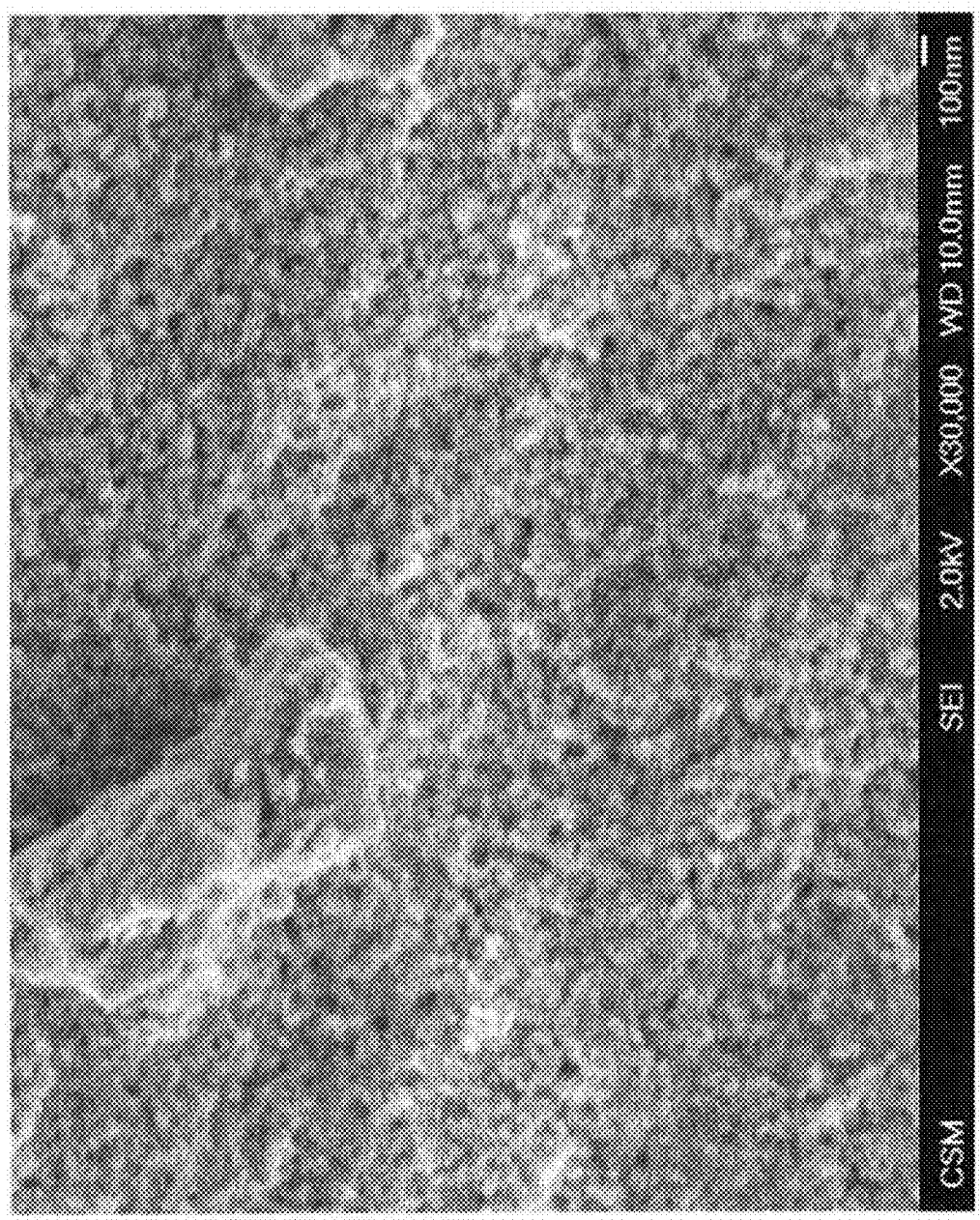

Example 2—Testing of $H_2S$ Capture Efficiency of the Two-Line Iron Slurry Made from Ferric Chloride and D-Sorbitol A two-line iron slurry synthesized as per Example 1 was tested for its $H_2S$ capture efficiency and regenerability. In particular, $H_2S$ was supplied from a compressed gas cylinder containing a 10% by volume hydrogen sulfide in a balance of nitrogen and mixed with nitrogen to generate an inlet concentration of approximately 2000 ppm $H_2S$. Alicat Scientific mass flow controllers were used to precisely control the inlet concentration at a total flow rate of 0.5 SLPM. Once mixed, the gases were supplied to the bottom of a 3-foot tall, one-half inch Sch. 80 clear PVC bubble column and went through an EPDM gasket sparger. A total of 20 mL of the 1 wt. % slurry was tested. The outlet hydrogen sulfide concentration was measured by a Shimadzu GC-14A gas chromatograph using a FPD detector and Agilent Hayesep Q 80-100 mesh column. FIG. 5c shows the six-cycle activity and capture efficiency of the slurry. Over the six cycles, the $H_2S$ capture efficiency was consistently greater than 95% until breakthrough. After each cycle, the slurry was regenerated by simple exposure to ambient air for about 30 minutes. Table 2, below, shows collected data for each cycle. The ferrihydrite slurry realizes a six-cycle activity of 7.89, a six-cycle capture efficiency of 98%, a six-cycle loss of 22%, and a six-cycle standard deviation of 0.36%. Further, all six capture cycles realized an activity of at least 1.16, the largest run-to-run loss was 9%, and the largest single capture cycle standard deviation was 0.81. After the first capture cycle, the largest single capture cycle deviation was 0.41%.

TABLE 2

Slurry activity and loss for two-line iron nanoparticles synthesized from ferric chloride and stabilized with D-sorbitol

| Cycle | Activity (cumulative moles of sulfur captured per mole of iron) | Loss (run-to-run) | Average Capture Efficiency | Standard Deviation |
|---|---|---|---|---|
| 1 | 1.48 | — | 97% | 0.81% |
| 2 | 1.45 | 2% | 99% | 0.18% |
| 3 | 1.33 | 9% | 98% | 0.41% |
| 4 | 1.27 | 4% | 99% | 0.33% |
| 5 | 1.20 | 6% | 98% | 0.20% |
| 6 | 1.16 | 4% | 98% | 0.22% |
| TOTAL | 7.89 | 22% | 98% | 0.36% |

Example 3—Testing of $H_2S$ Capture Efficiency of the Two-Line Iron Slurry Made from Ferric Sulfate and D-Sorbitol A ferrihydrite slurry similar to Example 1 was prepared, except using ferric sulfate as the iron salt instead of ferric chloride. The $H_2S$ capture efficiency and regenerability of this slurry was measured as per the conditions of Example 2. FIG. 6 shows the capture efficiency of and activity of this ferrihydrite slurry for six cycles. As shown in Table 3, the six-cycle activity only reaches 6.43, with a total loss in activity of 50%, and a six-cycle standard deviation of 1.82%. Further, three cycles were below an activity of 1.0, the largest run-to-run loss was 31% and the largest standard deviation was 4.34%.

TABLE 3

Slurry activity and loss for ferrihydrite slurry synthesized from ferric sulfate and stabilized with D-sorbitol

| Cycle | Activity | Loss (run-to-run) | Average Capture Efficiency | Standard Deviation |
|---|---|---|---|---|
| 1 | 1.32 | — | 92% | 2.42% |
| 2 | 1.50 | −13% | 97% | 0.26% |
| 3 | 1.05 | 30% | 92% | 2.38% |
| 4 | 0.94 | 11% | 98% | 0.51% |
| 5 | 0.96 | −2% | 97% | 1.03% |
| 6 | 0.66 | 31% | 96% | 4.34% |
| TOTAL | 6.43 | 50% | 95% | 1.82% |

Example 4—Testing of $H_2S$ Capture Efficiency of the Two-Line Iron Slurry Made from Ferric Chloride without Use of a Two-Line Iron Promoter A ferrihydrite slurry similar to Example 1 was prepared, except D-sorbitol was not employed. The $H_2S$ capture efficiency and regenerability of this slurry was measured as per the conditions of Example 2. FIG. 7 shows the capture efficiency of and activity of this ferrihydrite slurry for six cycles. The six-cycle activity was 8.10, the six-cycle loss was 31%, the six-cycle capture efficiency was 96%, and the six-cycle standard deviation was 0.28%. Further, all six capture cycles realized an activity of at least 1.13, the largest run-to-run loss was 11%, and the largest single capture cycle standard deviation was 0.76%. After the first capture cycle, the largest single capture cycle deviation was 0.34%.

TABLE 4

Slurry activity and loss for ferrihydrite slurry synthesized from ferric chloride

| Cycle | Activity | Loss (run-to-run) | Average Capture Efficiency | Standard Deviation |
|---|---|---|---|---|
| 1 | 1.65 | — | 96% | 0.76% |
| 2 | 1.49 | 10% | 93% | 0.34% |
| 3 | 1.33 | 11% | 96% | 0.15% |
| 4 | 1.25 | 6% | 96% | 0.18% |
| 5 | 1.26 | −1% | 96% | 0.16% |
| 6 | 1.13 | 11% | 98% | 0.08% |
| TOTAL | 8.10 | 31% | 96% | 0.28% |

Example 5—Production of Ferrihydrite Slurry with Slow Caustic Addition

A ferrihydrite slurry similar to Example 1 was prepared, except NaOH was slowly added at a constant rate over about a 3.5 hour period, resulting in the formation of both two-line iron and akaganeite. The $H_2S$ capture efficiency and regenerability of this slurry was measured as per the conditions of Example 2. FIG. 8 shows the capture efficiency of and activity of this ferrihydrite slurry for six cycles. The six-cycle activity was 6.92, the six-cycle loss was 28%, the six-cycle capture efficiency was 92%, and the six-cycle standard deviation was 2.85%. Further, two of the capture cycles realized an activity of at less than 1.0, the largest run-to-run loss was 26%, and the largest single capture cycle standard deviation was 4.26%. After the first capture cycle, the largest single capture cycle deviation was 4.26%.

TABLE 5

Slurry activity and loss for ferrihydrite slurry synthesized from ferric chloride

| Cycle | Activity | Loss (run-to-run) | Average Capture Efficiency | Standard Deviation |
|---|---|---|---|---|
| 1 | 1.34 | — | 89% | 3.63% |
| 2 | 0.99 | 26% | 89% | 4.26% |
| 3 | 1.01 | −2% | 93% | 4.10% |
| 4 | 1.50 | −48% | 93% | 0.96% |
| 5 | 1.12 | 25% | 94% | 2.10% |
| 6 | 0.97 | 14% | 95% | 2.06% |
| TOTAL | 6.92 | 28% | 92% | 2.85% |

Example 6—Testing of $H_2S$ Capture Efficiency of the Two-Line Iron Slurry Made from Ferric Chloride and Sodium Metasilicate A ferrihydrite slurry similar to Example 1 was prepared, except sodium metasilicate was used in lieu of D-sorbitol and in a molar ratio of 70:1 iron to silicon. The $H_2S$ capture efficiency and regenerability of this slurry was measured as per the conditions of Example 2. FIG. 9 shows the capture efficiency of and activity of this ferrihydrite slurry for six cycles. The six-cycle activity was 7.96, the six-cycle loss was 19%, the six-cycle capture efficiency was 93%, and the six-cycle standard deviation was 0.74%. Further, all six capture cycles realized an activity of at least 1.14, the largest run-to-run loss was 21%, and the largest single capture cycle standard deviation was 1.15%. After the first capture cycle, the largest single capture cycle deviation was 0.97%.

TABLE 6

Slurry activity and loss for ferrihydrite slurry synthesized from ferric chloride and sodium metasilicate

| Cycle | Activity | Loss (run-to-run) | Average Capture Efficiency | Standard Deviation |
|---|---|---|---|---|
| 1 | 1.54 | — | 93% | 1.15% |
| 2 | 1.44 | 6% | 91% | 0.97% |
| 3 | 1.14 | 21% | 93% | 0.47% |
| 4 | 1.32 | −15% | 91% | 0.54% |
| 5 | 1.28 | 3% | 93% | 0.95% |
| 6 | 1.25 | 3% | 95% | 0.36% |
| TOTAL | 7.96 | 19% | 93% | 0.74% |

Example 7—Testing of $H_2S$ Capture Efficiency of the Two-Line Iron Slurry Made from Ferric Chloride, D-Sorbitol and Sodium Metasilicate A ferrihydrite slurry similar to Example 1 was prepared, except sodium metasilicate was used in addition to the D-sorbitol and in a molar ratio of 70:1 iron to silicon. The $H_2S$ capture efficiency and regenerability of this slurry was measured as per the conditions of Example 2. FIG. 10 shows the capture efficiency of and activity of this ferrihydrite slurry for six cycles. The six-cycle activity was 8.47, the six-cycle loss was 22%, the six-cycle capture efficiency was 97%, and the six-cycle standard deviation was 0.26%. Further, all six capture cycles realized an activity of at least 1.24, the largest run-to-run loss was 9%, and the largest single capture cycle standard deviation was 0.65%. After the first capture cycle, the largest single capture cycle deviation was 0.36%.

TABLE 7

Slurry activity and loss for ferrihydrite slurry synthesized from ferric chloride, D-sorbitol and sodium metasilicate

| Cycle | Activity | Loss (run-to-run) | Average Capture Efficiency | Standard Deviation |
|---|---|---|---|---|
| 1 | 1.58 | — | 95% | 0.65% |
| 2 | 1.55 | 2% | 97% | 0.36% |
| 3 | 1.41 | 9% | 98% | 0.22% |

TABLE 7-continued

Slurry activity and loss for ferrihydrite slurry synthesized from ferric chloride, D-sorbitol and sodium metasilicate

| Cycle | Activity | Loss (run-to-run) | Average Capture Efficiency | Standard Deviation |
|---|---|---|---|---|
| 4 | 1.36 | 4% | 98% | 0.08% |
| 5 | 1.33 | 2% | 97% | 0.08% |
| 6 | 1.24 | 7% | 97% | 0.15% |
| TOTAL | 8.47 | 22% | 97% | 0.26% |

Example 8—Testing of $H_2S$ Capture Efficiency of the Two-Line Iron Slurry Made from Ferric Chloride with Chloride Ions Removed A ferrihydrite slurry similar to Example 1 was prepared, except the alkali and halide ($Cl^-$) ions were removed by centrifuging, decanting the supernatant, and adding back deionized water a total of five times. In addition, the slurry contained about 0.5 wt. % two-line iron nanoparticles. The $H_2S$ capture efficiency and regenerability of this slurry was measured as per the conditions of Example 2, except the inlet $H_2S$ concentration was approximately 1000 ppm. FIG. 11 shows the capture efficiency of and activity of this ferrihydrite slurry for six cycles. The six-cycle activity was 6.11, the six-cycle loss was 44%, the six-cycle capture efficiency was 93%, and the six-cycle standard deviation was 0.48%. Further, three of the six capture cycles realized an activity of less than 1.0, the largest run-to-run loss was 14%, and the largest single capture cycle standard deviation was 0.79%.

TABLE 8

Slurry activity and loss for ferrihydrite slurry synthesized from ferric chloride with chlorine anions removed

| Cycle | Activity | Loss (run-to-run) | Average Capture Efficiency | Standard Deviation |
|---|---|---|---|---|
| 1 | 1.35 | — | 92% | 0.14% |
| 2 | 1.20 | 11% | 95% | 0.40% |
| 3 | 1.03 | 14% | 94% | 0.55% |
| 4 | 0.95 | 8% | 93% | 0.52% |
| 5 | 0.83 | 13% | 93% | 0.51% |
| 6 | 0.75 | 9% | 91% | 0.79% |
| TOTAL | 6.11 | 44% | 93% | 0.48% |

Example 9—Testing of $H_2S$ Capture Efficiency of the Lepidocrocite Slurry Made from Ferrous Chloride A ferrihydrite slurry similar to Example 1 was prepared, except that ferrous chloride was used and NaOH was quickly added until pH 6-7 was reached, after which the solution was oxidized via an air sparger while maintaining the pH of 6-7 via regular NaOH addition. The resulting slurry contained 100% lepidocrocite as determined via IR. This slurry was diluted by deionized water to give a 0.5 wt. % ferrihydrite solution. The $H_2S$ capture efficiency and regenerability of this slurry was measured as per the conditions of Example 2, except the inlet $H_2S$ concentration was approximately 1000 ppm. FIG. 12 shows the capture efficiency of and activity of this ferrihydrite slurry for six cycles. The six-cycle activity was 6.90, the six-cycle loss was 18%, the six-cycle capture efficiency was 93%, and the six-cycle standard deviation was 0.35%. All six capture cycles realized an activity of at least 1.04, the largest run-to-run loss was 10%, and the largest single capture cycle standard deviation was 1.09%. After the first capture cycle, the largest single capture cycle deviation was 0.28%. As shown below, the capture efficiency increased for run 1 was only 85%, but the capture efficiency for runs 2-6 was ≥93%. Due to the increase in capture efficiency, it is believed that at least some two-line iron nanoparticles were produced when the fresh lepidocrocite slurry was regenerated, and that subsequent regeneration cycles also resulted in generation of two-line iron nanoparticles.

TABLE 9

Slurry activity and loss for ferrihydrite slurry synthesized from ferrous chloride

| Cycle | Activity | Loss (run-to-run) | Average Capture Efficiency | Standard Deviation |
|---|---|---|---|---|
| 1 | 1.27 | — | 85% | 1.09% |
| 2 | 1.16 | 9% | 93% | 0.20% |
| 3 | 1.24 | −7% | 94% | 0.28% |
| 4 | 1.11 | 10% | 95% | 0.27% |
| 5 | 1.07 | 4% | 94% | 0.15% |
| 6 | 1.04 | 3% | 95% | 0.10% |
| TOTAL | 6.90 | 18% | 93% | 0.35% |

Analysis of Examples 1-9

Table 10, below, compares the results of Examples 1-9. As shown, the slurries of Examples 3 and 5 are not considered invention slurries. The other slurries are considered invention slurries, being active, durable, and stable. The slurries of Examples 1 and 7 are particularly preferred, but the slurries of Examples 4, 6 and 8-9 are also useful.

TABLE 10

Results of Examples 1-9

| Ex. | Invention Slurry? | Six-Cycle Activity | Six-Cycle Loss | Largest Run-to-Run Loss | Six-Cycle Capt. Effic. | Six-Cycle Stand. Dev. | Cycles below 1.0 in Activity |
|---|---|---|---|---|---|---|---|
| 1-2 | Yes | 7.89 | 22% | 9% | 98% | 0.36% | Zero |
| 3 | No | 6.43 | 50% | 31% | 95% | 1.82% | Three |
| 4 | Yes | 8.10 | 31% | 11% | 96% | 0.28% | Zero |
| 5 | No | 6.92 | 28% | 26% | 92% | 2.85% | Two |
| 6 | Yes | 7.96 | 19% | 21% | 93% | 0.74% | Zero |
| 7 | Yes | 8.47 | 22% | 9% | 97% | 0.26% | Zero |
| 8 | Yes | 6.11 | 44% | 14% | 93% | 0.48% | Three |
| 9 | Yes | 6.90 | 18% | 10% | 93% | 0.35% | Zero |

While various embodiments of the new technology described herein have been described in detail, it is apparent that modifications and adaptations of those embodiments will occur to those skilled in the art. However, it is to be expressly understood that such modifications and adaptations are within the spirit and scope of the presently disclosed technology.

What is claimed is:

1. A method for producing a slurry comprising ferrihydrite nanoparticles, the method comprising:
   (a) preparing an aqueous solution having ferric iron cations, halide anions, and a 2LI promoter, wherein the preparing comprises:
      (i) adding an iron salt to the aqueous solution;
      (ii) adding a two-line iron promoter to the aqueous solution;
         (A) wherein, due to the adding steps (i) and (ii), the aqueous solution comprises a molar ratio of from 1:10 to 1:100 of the two-line iron promoter to iron (Fe) (promoter:Fe);
         (B) wherein, due to the adding steps (i) and (ii), the aqueous solution realizes an acidic pH;
   (b) precipitating ferrihydrite nanoparticles in the aqueous solution, thereby producing a ferrihydrite slurry, wherein the precipitating comprises:
      (i) contacting the aqueous solution with an alkali caustic, thereby raising the pH of the aqueous solution, wherein, after the contacting, the ferrihydrite slurry comprises ferrihydrite, the 2LI promoter, at least some alkali ions, and at least some of the halide anions;
   wherein the iron salt is selected from the group of consisting of ferrous chloride, ferric chloride and combinations thereof;
   wherein the 2LI promoter is selected from the group consisting of alcohols, polyols, polysaccharides, alkali metasilicates, and combinations thereof.

2. The method of claim 1, wherein the iron salt is ferric chloride.

3. The method of claim 1, wherein the 2LI promoter is selected from the group consisting of D-sorbitol, sodium metasilicate, and combinations thereof.

4. The method of claim 1, wherein the contacting step (b) comprises contacting the aqueous solution with the caustic at a rate such that at least 80% of the total amount of the caustic is added to the prepared aqueous solution within 2 hours.

5. The method of claim 4, wherein, after the contacting step (a), the aqueous solution is free of akaganeite.

6. The method of claim 5, wherein the ferrihydrite nanoparticles consist essentially of twoline iron nanoparticles.

7. A method for producing a slurry comprising ferrihydrite nanoparticles, the method comprising:
   (a) preparing an aqueous solution having ferric iron cations, halide anions, and a 2LI promoter, wherein the preparing comprises:
      (i) adding an iron salt to the aqueous solution;
      (ii) adding a two-line iron promoter to the aqueous solution;
         (A) wherein, due to the adding steps (i) and (ii), the aqueous solution comprises a molar ratio of from 1:2 to 1:1000 of the two-line iron promoter to iron (Fe) (promoter:Fe);
         (B) wherein, due to the adding steps (i) and (ii), the aqueous solution realizes an acidic pH;
   (b) precipitating ferrihydrite nanoparticles in the aqueous solution, thereby producing a ferrihydrite slurry, wherein the precipitating comprises:
      (i) contacting the aqueous solution with an alkali caustic, thereby raising the pH of the aqueous solution, wherein, after the contacting, the ferrihydrite slurry comprises ferrihydrite, the 2LI promoter, at least some alkali ions, and at least some of the halide anions;

wherein the 2LI promoter is selected from alcohols, polyols, polysaccharides, alkali metasilicates and combinations thereof.

8. The method of claim 7, wherein the 2LI promoter is selected from D-sorbitol, sodium metasilicate, and combinations thereof.

9. The method of claim 7, wherein the iron salt is selected from the group of consisting of ferrous chloride, ferric chloride and combinations thereof.

10. The method of claim 7, wherein the iron salt is ferric chloride.

11. The method of claim 7, wherein the contacting step (b) comprises contacting the aqueous solution with the caustic at a rate such that at least 80% of the total amount of the caustic is added to the prepared aqueous solution within 2 hours.

12. The method of claim 11, wherein, after the contacting step (a), the aqueous solution is free of akaganeite.

13. The method of claim 7, wherein the ferrihydrite nanoparticles consist essentially of twoline iron nanoparticles.

14. A method for producing a slurry comprising ferrihydrite nanoparticles, the method comprising:
  (a) preparing an aqueous solution having ferric iron cations, halide anions, and a 2LI promoter, wherein the preparing comprises:
    (i) adding an iron salt to the aqueous solution;
    (ii) adding a two-line iron promoter to the aqueous solution;
      (A) wherein, due to the adding steps (i) and (ii), the aqueous solution comprises a molar ratio of from 1:2 to 1:1000 of the two-line iron promoter to iron (Fe) (promoter:Fe);
      (B) wherein, due to the adding steps (i) and (ii), the aqueous solution realizes an acidic pH;
  (b) precipitating ferrihydrite nanoparticles in the aqueous solution, thereby producing a ferrihydrite slurry, wherein the precipitating comprises:
    (i) contacting the aqueous solution with an alkali caustic, thereby raising the pH of the aqueous solution, wherein, after the contacting, the ferrihydrite slurry comprises ferrihydrite, the 2LI promoter, at least some alkali ions, and at least some of the halide anions;
  wherein the 2LI promoter is selected from D-sorbitol, sodium metasilicate, and combinations thereof.

15. The method of claim 14, wherein the iron salt is selected from the group of consisting of ferrous chloride, ferric chloride and combinations thereof.

16. The method of claim 15, wherein the ferrihydrite nanoparticles consist essentially of twoline iron nanoparticles.

17. The method of claim 15, wherein the iron salt is ferric chloride.

18. The method of claim 15, wherein the contacting step (b) comprises contacting the aqueous solution with the caustic at a rate such that at least 80% of the total amount of the caustic is added to the prepared aqueous solution within 2 hours.

19. The method of claim 18, wherein, after the contacting step (a), the aqueous solution is free of akaganeite.

* * * * *